United States Patent

[11] 3,597,599

[72] Inventor William J. Melvin
Costa Mesa, Calif.
[21] Appl. No. 833,460
[22] Filed June 16, 1969
[45] Patented Aug. 3, 1971
[73] Assignee Collins Radio Company
Cedar Rapids, Iowa

[54] DIGITALIZED TONE GENERATOR
44 Claims, 19 Drawing Figs.

[52] U.S. Cl. 235/154
[51] Int. Cl. G06f 3/00
[50] Field of Search 235/154, 165, 167, 92; 340/340; 328/155

[56] References Cited

UNITED STATES PATENTS

| | | | |
|---|---|---|---|
| 3,493,965 | 2/1970 | Hargrove | 340/347 |
| 3,328,566 | 6/1967 | Kinzie et al. | 235/165 |
| 3,106,636 | 10/1963 | McIntyre et al. | 235/167 |

*Primary Examiner*—Maynard R. Wilbur
*Assistant Examiner*—Jeremiah Glassman
*Attorneys*—Robert J. Crawford and Bruce C. Lutz

ABSTRACT: A digitalized tone generator comprising a circulating loop containing, in series arrangement, a digitalized delay line means such as a shift register of N stages, and first and second full adders. A binary word of N bits circulates around the loop at a rate $f_s$ and is incremented by a value $K_1$ in said first full adder each circulation thereof to form a repeated sequence of $2^N$ binary words when $K_1=1$, each sequence representing a complete cycle of the tone being generated, and each binary word representing a unique phase angle of the cycle. At time intervals $T_d$, where $(1/T_d)>>f_s$, a variable value $K_2$ can be added to the circulating word in said second full adder to effectively change the phase thereof by desired increments. A library of such time-synchronous, phase-shifted tones is generated by applying multiplexing techniques to the above structure and making $K_1$ equal to different values.

INVENTOR.
WILLIAM J. MELVIN
BY Donald W. Phillips
ATTORNEY

INVENTOR.
WILLIAM J. MELVIN
BY Donald W. Phillion
ATTORNEY

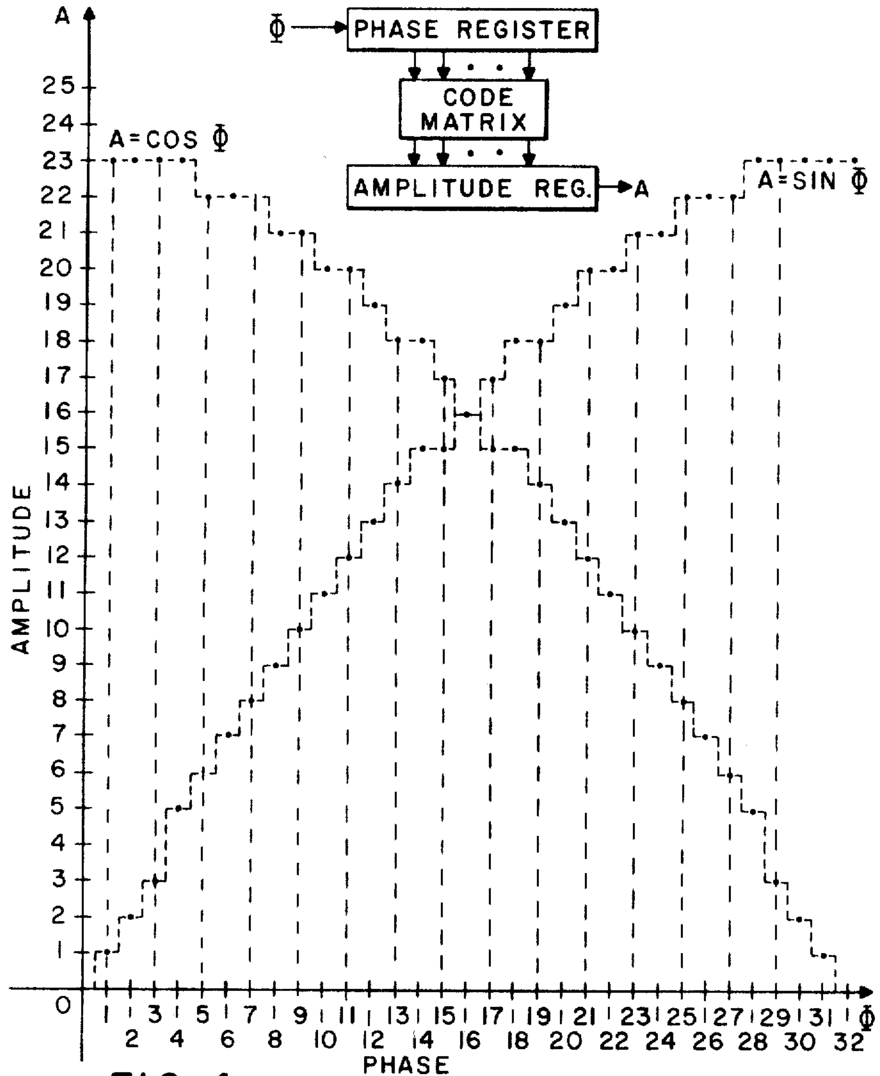
FIG. 4
| MESSAGE | $\Delta\Phi$ | $K_2$ |
|---|---|---|
| $M_1M_2$ | 315° | 112=64+32+16 |
| $S_1M_2$ | 225° | 80=64+ 16 |
| $S_1S_2$ | 135° | 48= 32+16 |
| $M_1S_2$ | 45° | 16= 16 |
FIG. 5
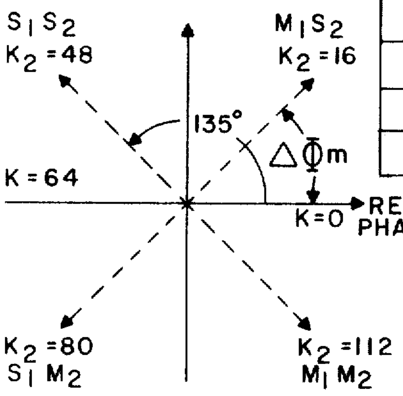
FIG. 6
INVENTOR.
WILLIAM J. MELVIN
BY Donald W. Phillips
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillion
ATTORNEY INVENTOR.
WILLIAM J. MELVIN
BY Donald W. Phillips
ATTORNEY

DIGITALIZED TONE GENERATOR

This invention relates generally to tone generators and more specifically to a digitalized tone generator capable of generating a multiplicity of digitalized tones and with the capability of changing the phase of each tone at periodic intervals of time.

One of the most efficient and rapidly growing means of transmitting data from one point to another is through the use of phase shifted tones. More specifically the tone is divided up into equal and consecutive time intervals, known generally as time synchronous division of the tone. Within each time interval or frame the tone is caused to have a particular phase with respect to some reference phase. For example, if two bits of information, each of which can be a "1" or a "0" are to be encoded in each frame of the tone, the said tone can have a phase relation with the reference phase of either 45°, 135°, 225°, or 315°, depending on the particular combination of two bits being encoded. Each of these phases are spaced apart by 90° and identified herein as phasor positions. Four phasor positions are possible when two data bits are encoded on a tone since there are four possible combinations of "0's" and "1's" of the two data bits. The tone within a given time frame, however, can have only one phase.

While the reference phase can be in the form of a separate tone it is more usually based on the phase of the preceding phasor. Thus if a given phasor contains data bits which require a phase relation of 45° with said reference phase then said phasor will be generated in such a way that its phase will lead the phase of the previous phasor by 45°. As another example, if a given phasor contains data bits which require that its phase be 225° ahead of the reference phase, then said received phasor will be generated to have a phase relationship which leads the phase of the preceding phasor by 225°. Reference is made to U.S. Pat. No. 2,905,812 issued Sept. 22, 1959, to Doelz et al. and entitled, "High Information Capacity Phase Pulse Multiplex System" for a more detailed discussion of the use of phasors as a means of encoding information thereon for transmission purposes.

As another example of the generation and use of phasors, reference is made to U.S. Pat. No. 3,131,363 issued Apr. 28, 1964 to R. W. Landee et al. and entitled, "Instantaneous Phase Pulse Modulator."

Substantially all of the prior art means, including the two above-identified U.S. patents, for generating tones which are phase modulated in a time synchronous manner utilized analog techniques. More specifically such prior art devices in general employ the technique of generating the tone in sine wave form and then shifting the phase of said tone by predetermined increments at periodic time intervals. Specifically, for example, in the aforementioned Landee patent, the given tone is expanded into four tones, all having the same frequency as the given tone, but spaced apart 90° to form the four possible phasors. Other logic means are then provided to select one of these four phasors to represent a given combination of a pair of bits.

By proper frequency spacing several of these tones can be simultaneously transmitted over an appropriate medium such as a telephone line for example. With such appropriate frequency spacing between tones it is possible to extract each tone from the composite signal with little or no distortion from the unwanted tone. Generally such extraction or filtering is accomplished by supplying the composite signal with little or no distortion from the unwanted tone. Generally such extraction or filtering is accomplished by supplying the composite signal to a filter which is tuned to the frequency of the desired tone for a period of time during each phasor equal to the period of the frequency spacing between tones. During the driving period all tones, except the tone to be filtered, will shift in phase with respect to the tuned center frequency of the filter an integral number of cycles so that the energy supplied to the filter during the first portion of the driving period is substantially canceled by the energy supplied to the filter during the latter half of the driving period. Thus all of the tones except that tone whose frequency is equal to the tuned frequency of the filter are effectively blocked by the filter. For a further detailed description of the use of a multiplicity of time-synchronous, phase-modulated tones, reference is made to U.S. Pat. No. 2,905,812 issued Sept. 22, 1959 to Doelz et al. and entitled, "High Information Capacity Phase Pulse Multiplex System."

The foregoing means of phase modulating data onto a tone has worked well for many years. However, as the use of data processors has multiplied in an ever increasing manner in almost all phases of our society the need for better and more reliable means for transmitting data, including the generation of phase modulated tones, has also grown.

It is a primary object of the present invention to provide a more reliable and less expensive means for generating phase modulated tones than has heretofore been known.

In accordance with a form of the invention capable of generating a single tone there is provided a circulating loop containing in series arrangement, a digitalized delay line means, such as a shift register, and first and second full adder means, each of which is assumed to have no delay, in this embodiment of the invention. A binary word, which consists of seven bits but which can consist of some other number of bits, circulates in this loop through first and second full adders and the shift register delay means, which is seven bits long.

Each time the 7-bit binary word circulates around the loop it is incremented by a count of one in the first full adder. Since the binary word is seven bits long, the word can be incremented by a count of one 128 times, at which time it will return to zero and the cycle will repeat. The 128 different 7-bit binary words define one complete cycle of the tone being generated, with each successive incremented value of the binary word representing an incremental phase position within the cycle of the tone being generated. More specifically, 360° divided by 128 equals about 2.8° of phase incrementation with each additional count increment of one in the circulating binary word. This circulating, phase representing 7-bit binary word is also referred to herein as a "phase word." Thus each of the 128 different values of the phase word as it circulates through the loop represents a unique phase angle of the cycle of the tone being generated.

Decoding means are provided, along with a suitable timing means, which examines the circulating phase word once each circulation when such phase word is resident in the 7-bit shift register, and functions to translate said binary phase word into a binary word representative of the magnitude of the sine wave cycle at each particular phase angle represented by the phase word.

Additional means are provided to translate the sine magnitude word into analog pulses which in turn are supplied to a low pass filter which functions to generate the analog tone in sine wave form.

As discussed above, the encoding of data upon the generated tone involves the shifting of the phase of the tone at periodic time intervals by predetermined amounts in accordance with the data encoded. Such shifting in phase is effected in the circulating phase words by adding in the second full adder, at the tone frame transition time, a count increment in accordance with the phase shift desired. More specifically, as discussed above, with two data bits encoded on the tone the desired phase shifts are either 45°, 135°, 225°, or 315°. The count increment corresponding to each of these phase shifts are 16, 48, 80, and 112, respectively. Appropriate logic means are provided to examine each pair of data bits supplied to the tone generator and at each frame tone transition time to supply the proper count increment to the circulating word in the second full adder. Such changes in phase are instantaneous.

In accordance with another form of the invention there is provided means for generating a plurality of tones on each of which can be encoded two data bits within each frame. As in the case of the single tone generator, each of the tones in the multiple tone generator circulate within a circulating loop, and in a serial manner. Said circulating loop, however, must contain additional delay line means, such as a larger shift register. For example, if 17 tones are being generated, then the shift register capacity must be 7 × 17 or 119 bits which requires that the shift register have 119 stages.

The group of 17 words are circulated once around the loop each sampling period (the sampling rate $=f_s$). As each phase word passes through the first full adder, the said phase word is incremented. Appropriate timing means are provided to identify each phase word as it enters the first full adder each time it circulates within the loop.

Since each phase word represents the generation of a tone having a frequency different from every other tone, the amount that each phase word is incremented is different. For example, if the first phase word $\Phi_0$ is incremented by a count of 1 each circulation thereof in the loop and the sampling rate is 7040 Hz., then the frequency of the tone generator will be 7040 divided by 128 or 55 Hz. If the second phase word $\Phi_1$ in the group of 17 is incremented by a count of 2 each circulation of the loop, then a frequency of 110 Hz. will be generated since the phase word $\Phi_1$ passes through the sequence of binary words representing a complete cycle of the tone being generated twice as fast as does the phase word $\Phi_0$.

In a similar manner the succeeding phase words of the 17 phase words are incremented by other counts, usually in successively increasing amounts, as for example by counts of 3, 4, 5, 6, and so on, to generate a library of tones each spaced from the succeeding tone by a given frequency spacing. In the specific example just described the frequency spacing is 55 Hz.

Also as in the case of the single tone generator, there is provided a means for identifying each phase word as it passes through the second full adder. At each occurrence of the frame transition of the tone being generated an appropriate count increment is added to each phase word to reflect the nature of the two bits being encoded thereon at that particular frame transition time. It is to be noted that the frame transition time, for all of the tones being generated, is substantially the same and occurs during the same circulation of the group of phase words around the loop.

Appropriate means are provided to store and examine an incoming stream of data bits which are to be encoded on the tones being generated.

Other means are provided, including an output shift register means, for examining each 7-bit phase word as it circulates in the loop after it has passed through the two full adders where incrementation has taken place. A phase-to-amplitude converter is provided which, in essence, examines each 7-bit phase word and transforms such phase word into another binary word representing the magnitude of the sine wave corresponding to the phase angle defined by the phase word.

Appropriate timing means are included to identify each phase word as it enters the 7-bit output shift register of the system described above. Since all the tones being generated are going to be combined into a single composite tone, it is possible to accumulate all 17 of the sine magnitude binary words during each circulation of the phase words in the loop and to output a single sine magnitude binary word which is the summation of all the accumulated sine magnitude words. A digital-to-analog converter transforms such cumulative sine magnitude words into analog pulses which occur once each circulation in the loop (at the sampling rate $f_s$). A filter means functions to generate the composite tone from the output of the digital-to-analog converter.

The above-mentioned and other objects and features of the invention will be more fully understood from the following detailed description thereof when read in conjunction with the drawings in which:

FIG. 1 includes a pair of waveforms showing the generation of tones by the use of phase words and also includes charts showing the frequency spectrum created thereby;

FIG. 4 is a chart showing the relationship between phase words and the corresponding sine magnitude binary words;

FIG. 5 is a chart showing the phase relation of successive phasors in accordance with the encoding of different combinations of pairs of bits thereon, and the count increment required to produce the desired phase shifting between frames;

FIG. 6 is a vector diagram showing the four possible phasor positions needed to accommodate the four possible combinations of pairs of data encoded on a given phasor;

Figure 2:
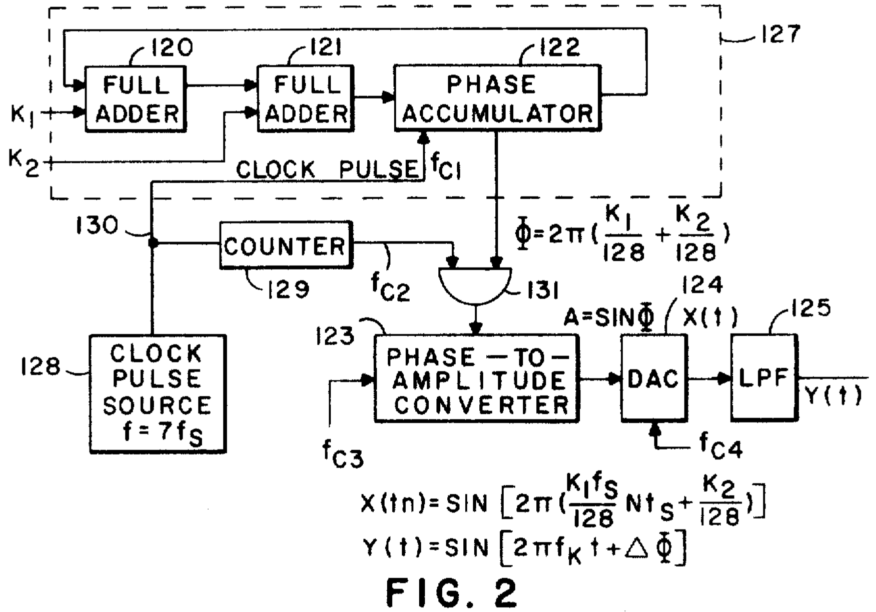
FIG. 2 is a basic logic diagram of a single tone generator.
Figure 7:
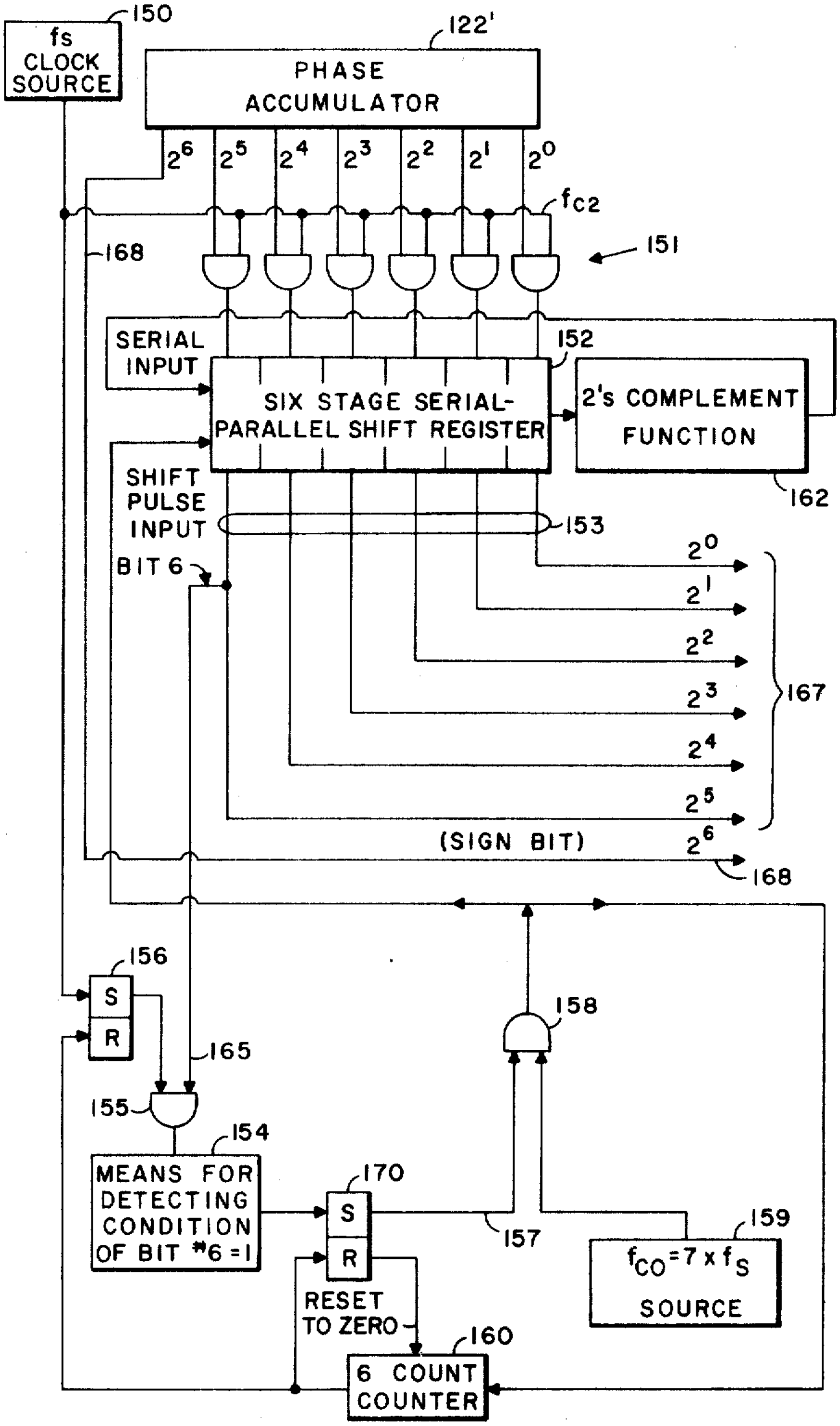
Figure 8:
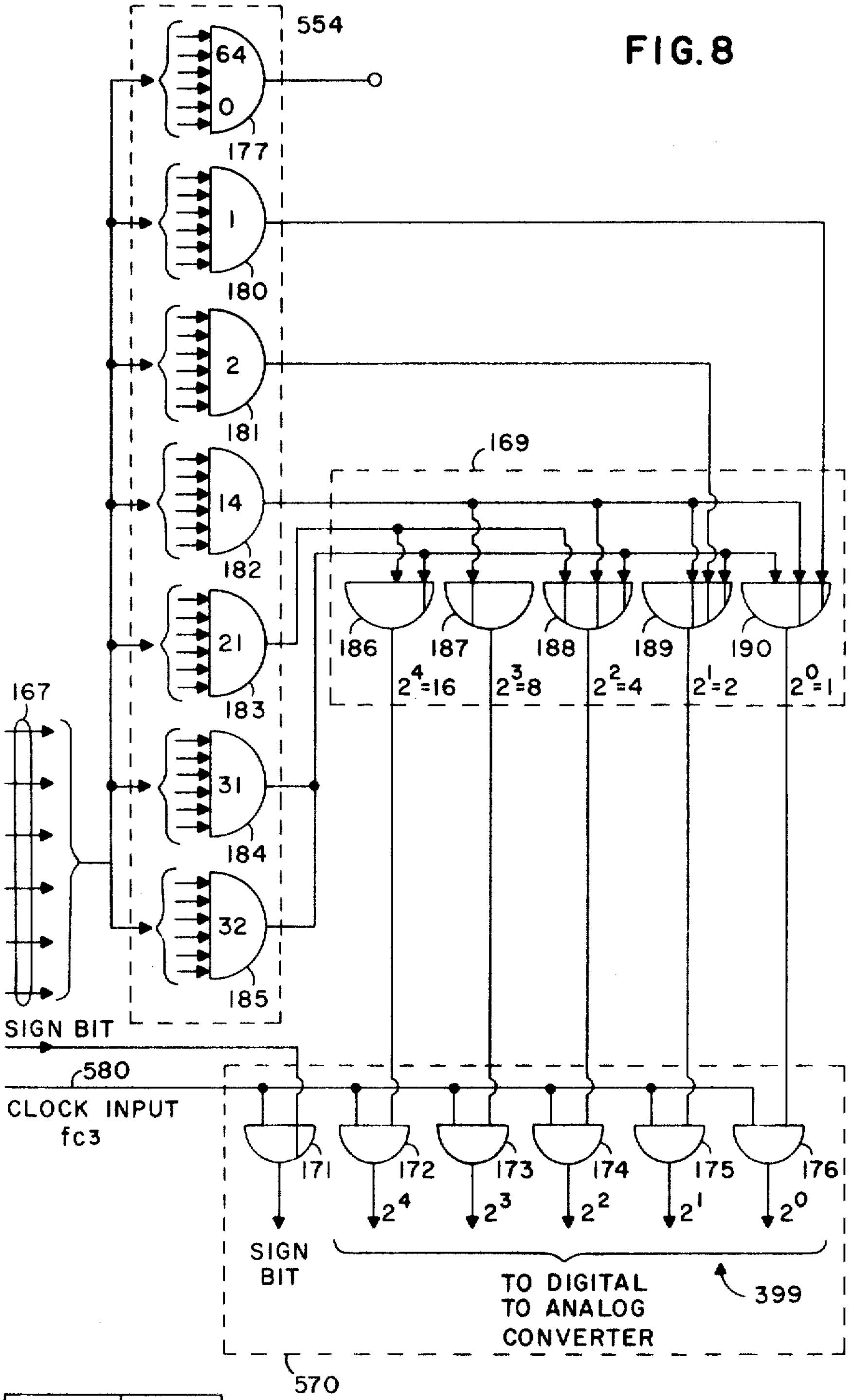
Figure 9:
Figure 10:
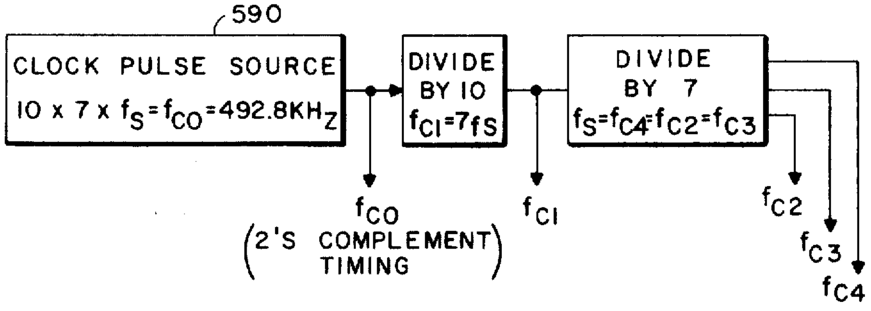
Figure 11:
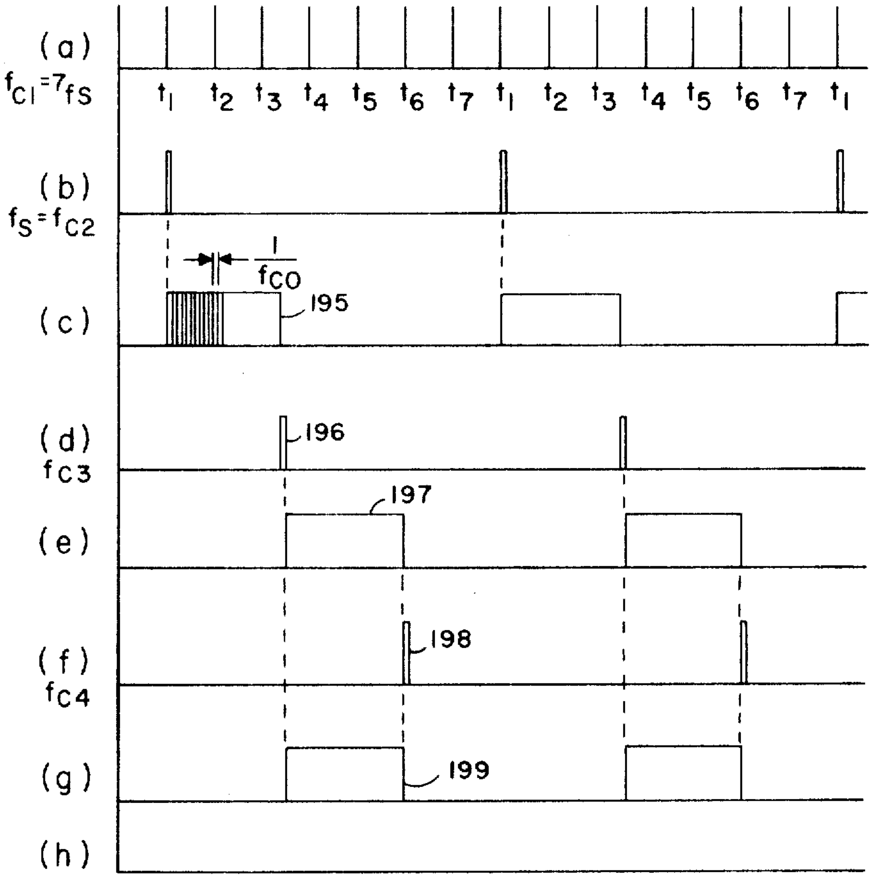
Figure 12:
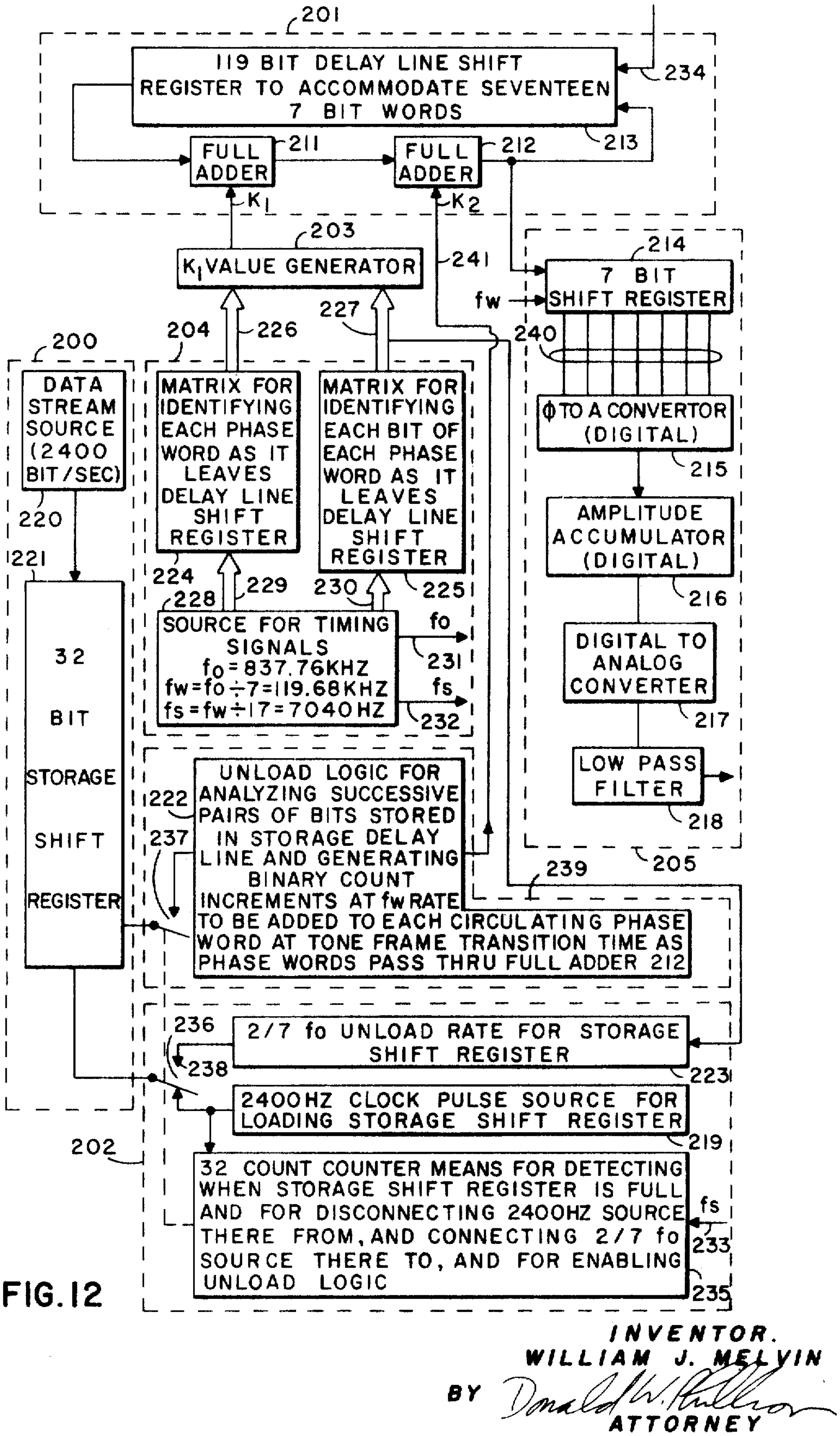
Figure 13:
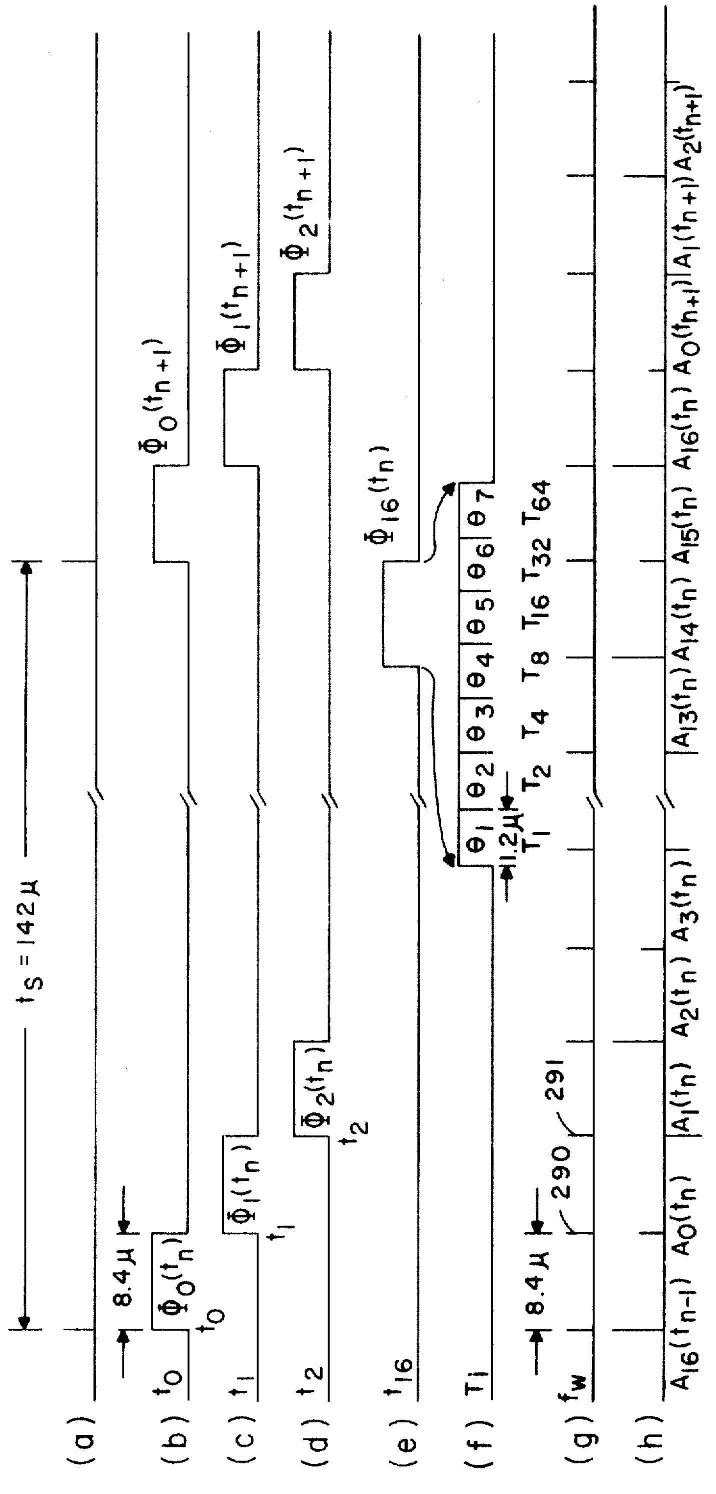
Figure 14:
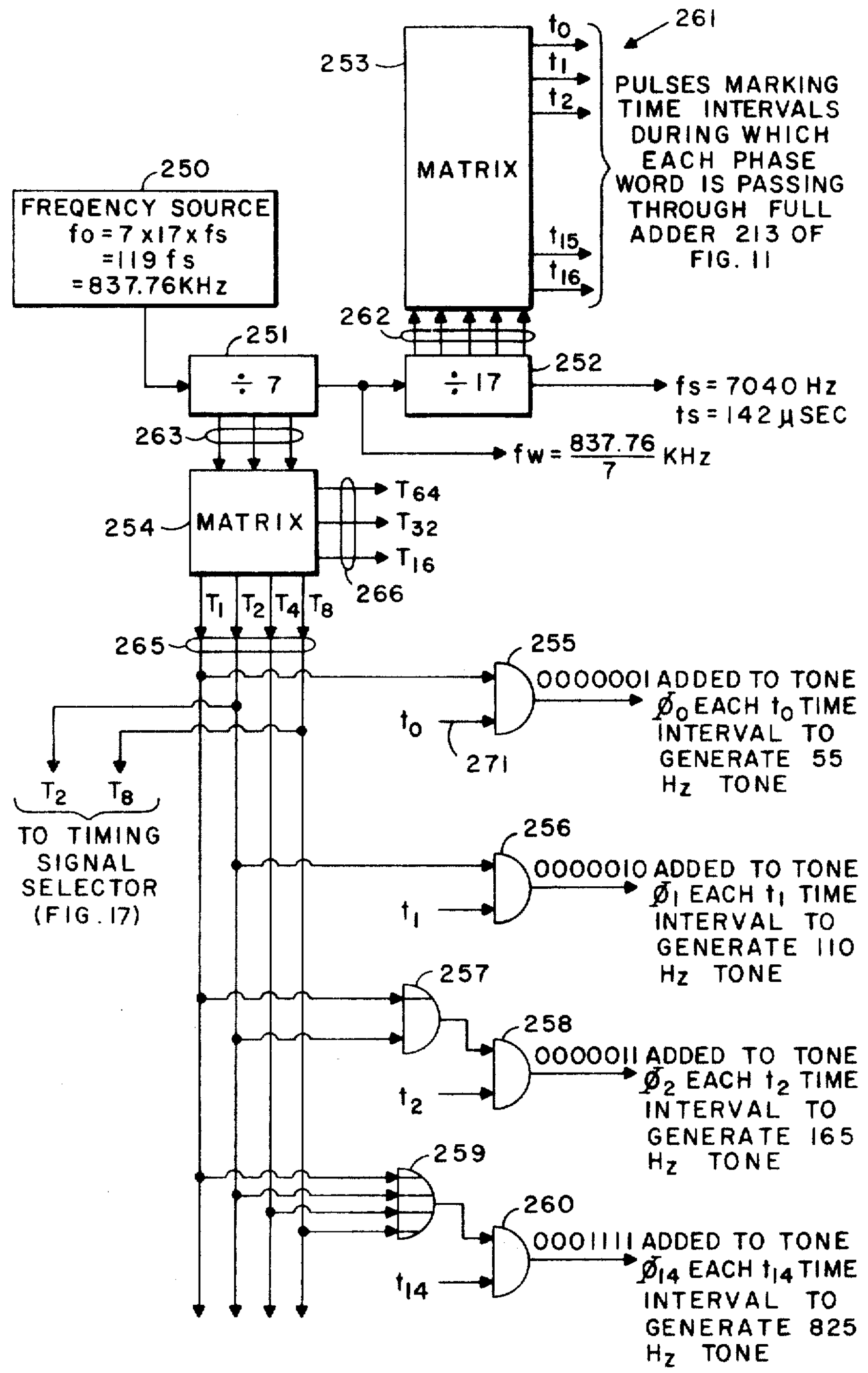
Figure 15:
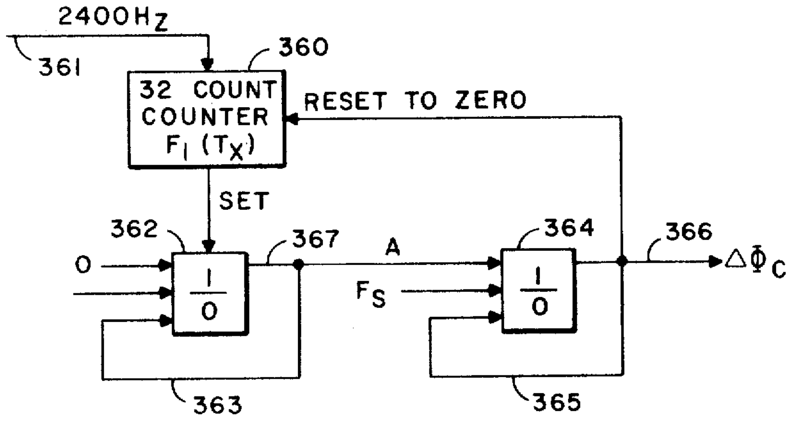
Figure 16:
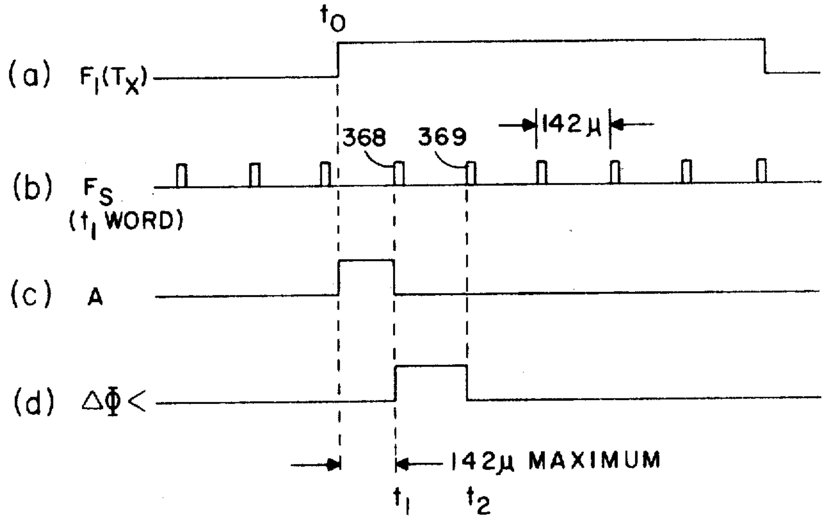
Figure 17:
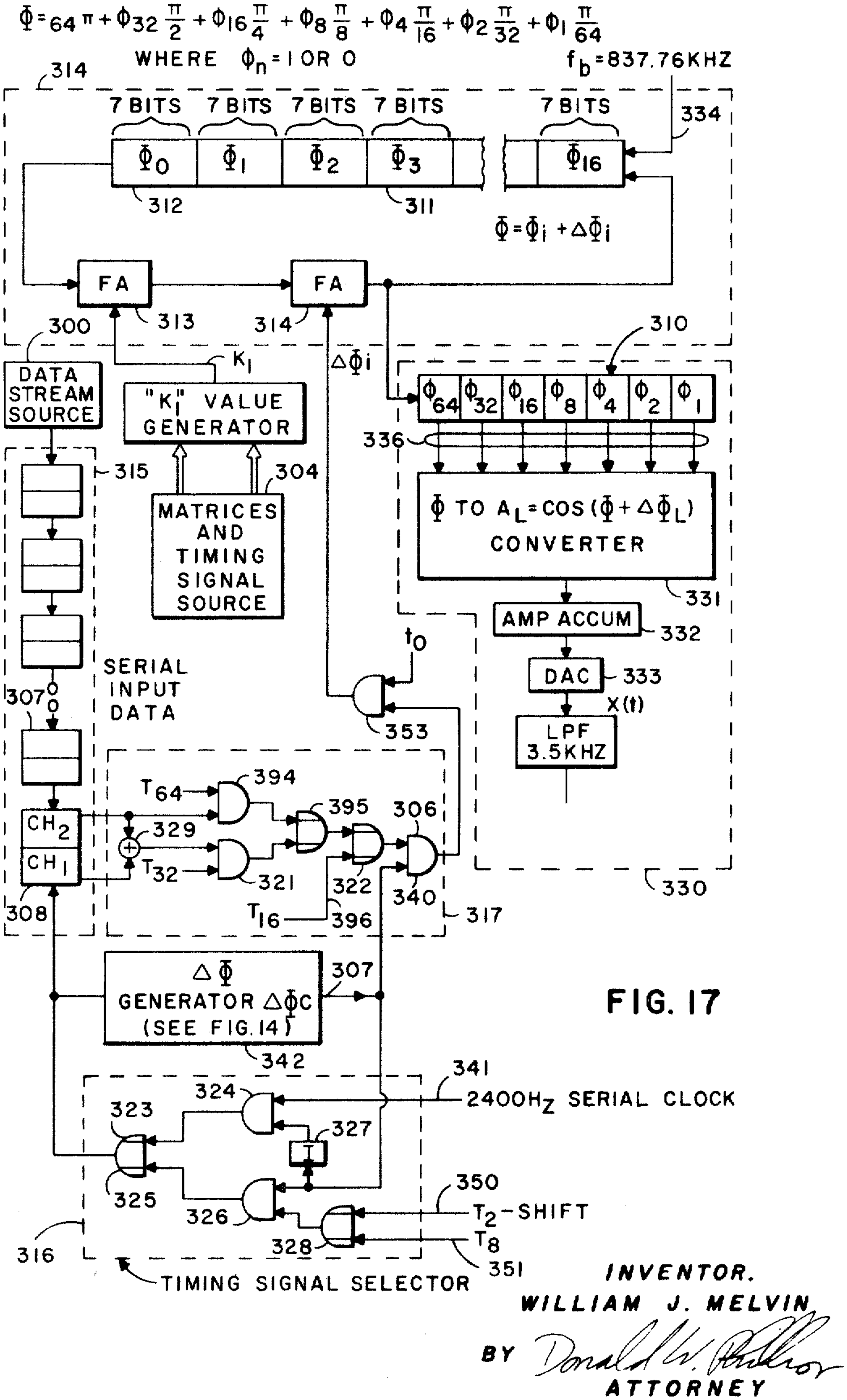
Figure 18:
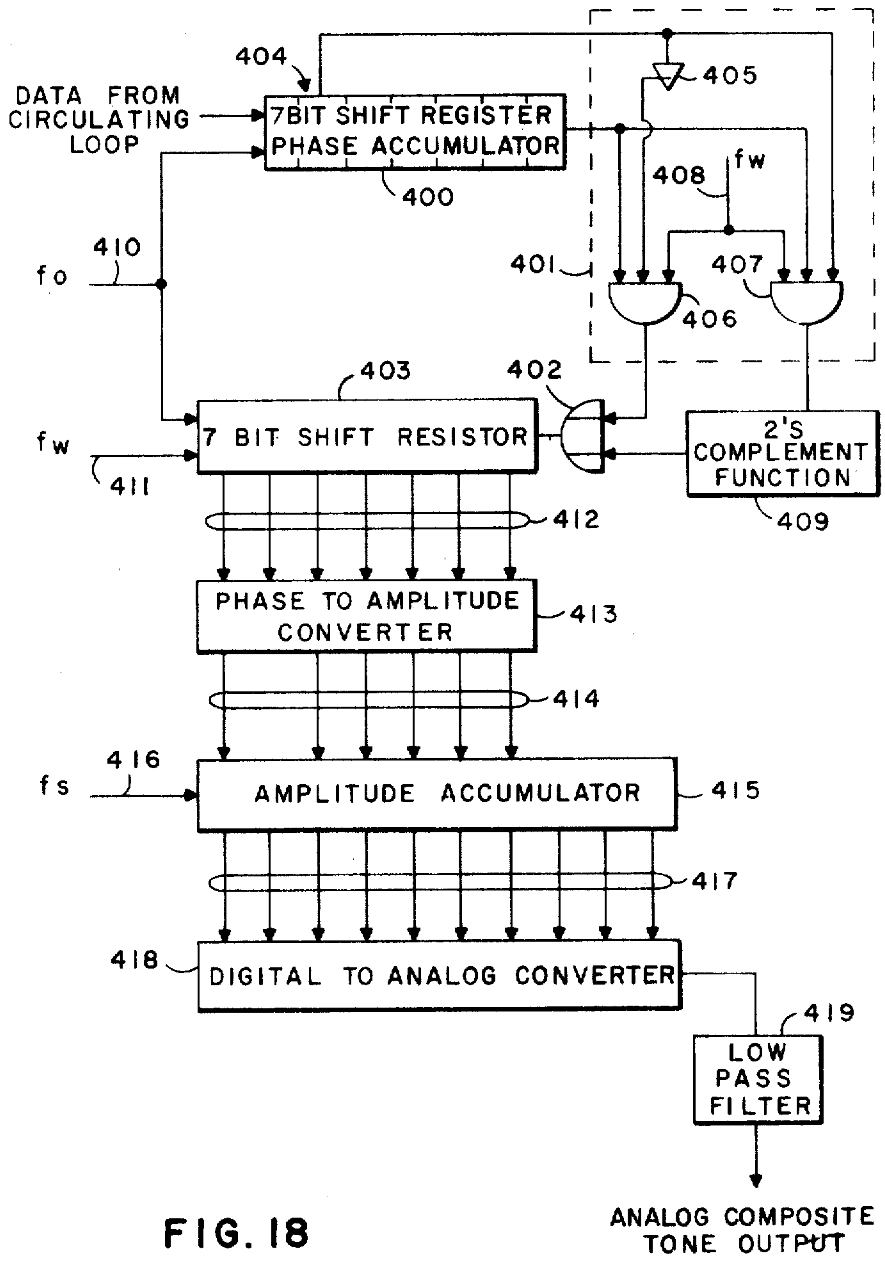
Figure 19:
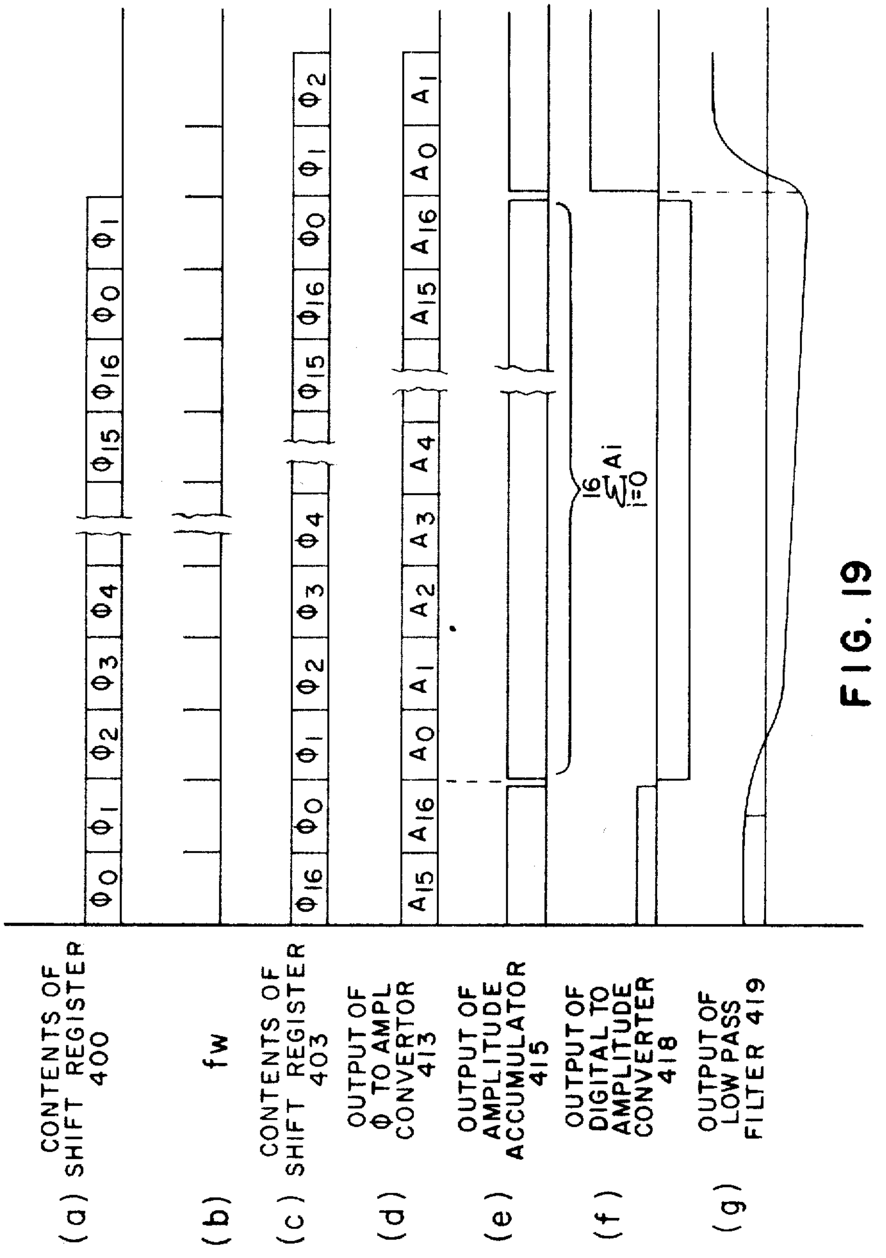

FIGS. 7 and 8 fit together as shown in FIG. 9 to convert the phase words to sine magnitude words;

FIG. 10 is a simplified form of the timing means required to operate the single tone generator shown in FIG. 2;

FIG. 11 is a series of waveforms showing the outputs of the timing diagram of FIG. 10 and how such outputs function to operate the single tone generator of FIG. 2;

FIG. 12 is a logic diagram of a multiple tone generator;

FIG. 13 is a set of waveforms illustrating the general operation of the multiple tone generator of FIG. 12;

FIG. 14 is the logic diagram for generating the timing signals required to operate the multiple tone generator of FIG. 12 and also includes the logic required to generate the count increments required to shift the phases of the various tones at the frame transition times by an amount in accordance with the nature of data bits being encoded;

FIG. 15 is a logic diagram for the generation of a $\Delta\Phi$ pulse employed in unloading the input storage shift register into which the raw data bits is serially supplied;

FIG. 16 is a set of timing waveforms illustrating the operation of the logic diagram of FIG. 15;

FIG. 17 is a more detailed logic diagram of the multiple tone generator and shows in more detail the logic required to load the input shift register into which the raw stream of data is supplied, and to read and analyze said data from said input shift register into the phase word being generated by the system;

FIG. 18 is a logic diagram illustrating the means by which the phase words of the multiple tone generator are transformed into amplitude words, and ultimately into an analog composite signal which consists of all the tones being generated;

FIG. 19 is a set of waveforms illustrating the operation of the logic diagram of FIG. 18.

Due to the relative complexity of the present invention it will be discussed in sections in accordance with the general outline set forth below.

I—GENERAL DISCUSSION OF THE GENERATION OF TONES BY USE OF BINARY WORDS REPRESENTING PHASE ANGLE

II—SINGLE TONE GENERATOR

- A. General Description
- B. Means For Translating Phase Words To Sine Magnitude Words
- C. Timing Means

III—MULTIPLE TONE GENERATOR

- A. General Description
  1. Generation of $K_1$ Increments
  2. Generation of $K_2$ Increments
  3. The Output Circuit
- B. Detailed Description of Multiple Tone Generator
  1. Timing Circuits and Generation of $K_1$ Tone Generating Count Increments
  2. Generation of $K_2$ Phase Shifting Count Increments
     - a. Low and High Speed Shifting of Data Into and Out of Input Storage Register
     - b. High Speed Readout and Analysis of Data Bits Stored in 32 Bit Input Shift Register
     - c. Generation of Gating Pulse $\Delta\Phi$ For Unloading Input Shift Register
  3. Phase-to-Amplitude Binary Word Conversion Certain symbols will be used in the specification to denote certain type of binary words. Such symbols are listed below.

$\Phi_0, \Phi_1, \Phi_2, \ldots \Phi_{17}$. Each $\Phi_n$ represents a 7-bit binary word which indicates the phase angle of the tone being generated at any given time.

$A_0, A_1, A_2, — A_{17}$. . Each $A_n$ represents a 7-bit binary word indicative of the amplitude of the tone at the corresponding phase angle ($\Phi_n$).

$K_1$. . . . . . . . . Represents the binary increment added to each phase word $\Phi_n$ each sample time to generate a tone in terms of $\Phi_n$.

$K_2$. . . . . . . . . Represents the binary increment added to each phase word $\Phi_n$ at the frame transition time of the tone to advance the phase thereof in accordance with the nature of the pair of bits being encoded thereon.

I—GENERAL DISCUSSION OF THE GENERATION OF TONES BY USE OF BINARY WORDS REPRESENTING PHASE ANGLE

Before discussing the specific logic required to generate a phase word representing a tone a general discussion of tone sampling will be set forth to facilitate a better understanding of the invention.

Figure 1:
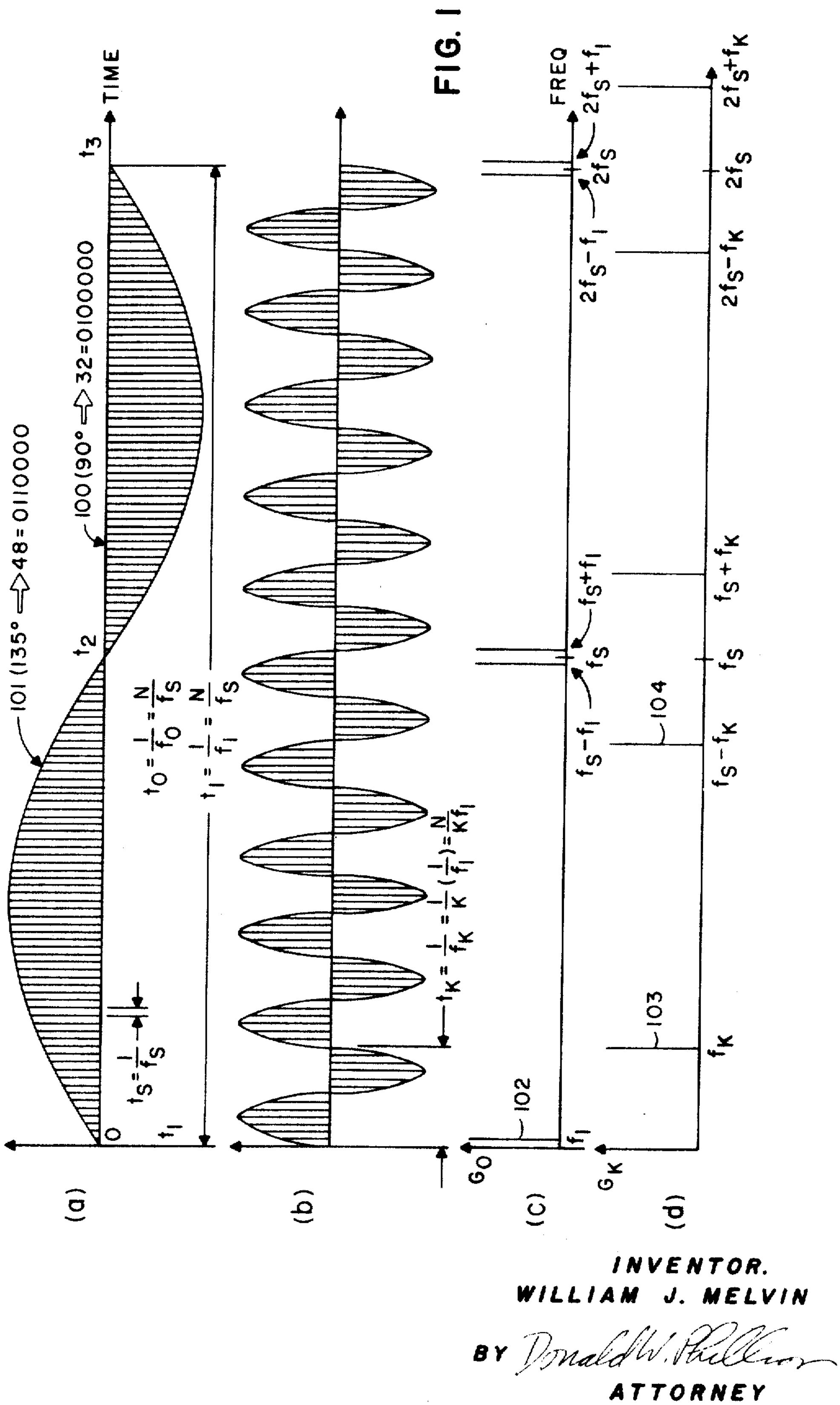

The response of a periodic sampling device to a sinusoidal input consists of an ordered sequence of sample values, one every $t_s$ seconds, where $t_s$ is the sample interval and $f_s=(1/t_s)$ is the sampling frequency, and $f_1$ is the frequency of the sampled sinusoidal input. Reference is made to FIG. 1*a* which shows the sampling rate of $f_s$ upon the sinusoidal input of frequency $f_1$.

The spectrum of such a sampled signal consists of spectral concentration at multiples of the sampling frequency, $Nf_s$, plus or minus the sampled frequency $f_1$, where N can be zero or any integer. Such a frequency spectrum for the sampled waveform of FIG. 1*a* is shown in FIG. 1*c*. It is to be noted that the fundamental frequency $f_1$, represented by line 102 in the frequency spectrum of FIG. 1*c*can be recovered by a low pass filter which cuts off above frequency $f_1$ and below the frequency $f_s-f_1$. As will be discussed later such a low pass filter usually has a cutoff point of $(f_s/2)$ which lies midway between frequency $f_1$ and the frequency $f_s-f_1$ of FIG. 1*c*.

FIG. 1*b* shows the samplings required to generate a harmonic of the waveform of FIG. 1*a*. More specifically the waveform of FIG. 1*b* represents the eleventh harmonic since it is sampled 128 times over 11 cycles. More generally the $K^{th}$ harmonic of $f_1$ would be sampled 128 times over K cycles.

Referring now to FIG. 1*a* there is shown a sine wave formed by a series of samplings represented by vertical lines. There are a number of ways that a sine wave can be represented. More specifically a sine wave can be represented in an analog manner as an alternating current or voltage. A sine wave can also be represented in some coded manner such as for example a series of evenly spaced pulses which contain different amounts of energy such that when they are filtered through an appropriate filter, a sine wave signal is detected.

A third means of representing a sine wave is by binary words or by a succession of binary words which occur synchronously, that is to say at evenly spaced time intervals, and each of which has a value representative of the amplitude of the sine wave at that particular point in time. Appropriate decoding means are used to decode the binary word into pulses which are then passed through a low pass filter to form an analog sine wave.

A fourth method of depicting a sine wave is by means of a series of successive binary words which can be time synchronous in nature with each binary word having a value representing the phase of a cycle of the sine wave being generated. More specifically the number of degrees of phase incremented by each successive binary word is determined by the number of binary words occurring within a given cycle of the sine wave. For example, assume that it is desired to represent a sine wave of frequency $f_0$ by 128 phase divisions per cycle. Thus each increment of phase represented between successive binary words is equal to 360°/128 or about 2.8°.

As a specific example of the above, assume that the binary word, 0000000, represents the 0° phase position of a cycle of the sine wave. The binary word 0000001, which has a decimal value of 1, represents the first phase increment of 2.8°. The binary word 0010000, which has a decimal value of 16, represents the 45° mark in the cycle. The binary number 0100000, which has a decimal value of 32, represents the 90° mark of the sine wave, and so on.

Reference is made to the following chart which shows the correspondence between the various phase increments represented by the binary numbers between 0 and 127.

CHART A

| Phase Angle Increment = 360°/128=2.8°=I | Represented by Binary Number |
|---|---|
| 0I = 0° or 360° | 0000000=0 |
| I | 0000001=1 |
| 2I | 0000010=2 |
| 3I | 0000011=3 |
| 4I | 0000100=4 |
| 5I | 0000101=5 |
| 6I | 0000110=6 |
| 7I | 0000111=7 |
| 8I=22½° | 0001000=8 |
| 9I | 0001001=9 |
| 10I | 0001010=10 |
| 11I | 0001011=11 |
| 12I | 0001100=12 |
| 13I | 0001101=13 |
| 14I | 0001110=14 |
| 15I | 0001111=15 |
| 16I=45° | 0010000=16 |
| 32I=90° | 0100000=32 |
| 48I=135° | 0110000=48 |
| 64I=180° | 1000000=64 |
| 80I=225° | 1010000=80 |
| 96I=270° | 1100000=96 |
| 112I=315° | 1110000=112 |
| 127I=357.2° | 1111111=127 |

It will be noted that the generation of the binary words representing the phase of a sine wave cycle is a linear function with time. That is to say, the binary words representing the phase of a cycle of a sine wave increase proportionally with time and are completely independent of the variations of the amplitudes of the sine wave.

On the other hand, a system of binary words representing periodic amplitude of a sine wave, and which occur in a time synchronous manner, would be proportional to a sine wave function and would be a nonlinear function.

The important distinction between the linear function of phase representation of a sine wave and the nonlinear function of amplitude representation of a sine wave is as follows. In the case of representation of phase by binary words the sine wave being represented can be phase shifted instantaneously simply by adding a binary number to the binary number representing a phase position in the sine wave cycle. For example assume that at a given instant in time the phase word 0010000, which equals 16 and represents the phase position 45°, is being generated. A phase shift of 90° can be effected simply by adding to the phase word the binary word representing 90°, which binary word is 0100000 and has a value of 32, as can be seen from the foregoing chart.

This type of phase shift cannot easily be accomplished with binary words representing amplitudes of a sine wave since such a function is not linear.

It should be noted that the binary words representing the phase positions of the sine wave cycle must be decoded, in an appropriate decoding means, into amplitude representing binary digits which in turn are translated into pulses, the pulses then being filtered to produce the analog sine wave.

Returning again to FIG. 1*a* it is assumed that the vertical lines in FIG. 1*a* represent a division of the sine wave into phase increments, with the binary number as shown in the above chart representing the phase of the cycle at a given point in time. As mentioned above, 128 phase divisions has been selected as a suitable division factor primarily because 128 is equal to $2^7$ which permits shifting of phase by a half cycle, a quarter cycle, or an eighth cycle simply by dividing by 2, 4, or 8.

Furthermore, the use of phase division of the sine wave signal as opposed to amplitude sampling representation permits easy generation of harmonics.

For example, to generate the $K^{th}$ harmonic of the fundamental frequency $f_1$ of FIG. 1*a* it is only necessary to generate every $K^{th}$ binary number of the above chart. Thus if it is desired to generate the $11^{th}$ harmonic, then every $11^{th}$ binary number of the above chart must be generated which in turn produces the sequence of binary numbers shown in Chart B below.

It is to be specifically noted that the same group of binary numbers is not necessarily regenerated each time the selection of binary numbers progresses through the 128 possible selections. For example, in generating the $11^{th}$ harmonic the decimal equivalents of the binary numbers selected are 0, 11, 22, 33,—121 the first time through the 128 37possible selections, and then are 4, 15, 26, 37—etc., the second time through the 128 possible selections.

CHART B

| Phase Angle Increment For 11th Harmonic | Binary Word Representation |
|---|---|
| 01 | 0000000 |
| 111 | 0001011 |
| 221 | 0010101 |
| 331 | 0100001 |
| 441 | 0101100 |
| 551 | 0110111 |
| 661 | 1000010 |
| 771 | 1001101 |
| 881 | 1011000 |
| 991 | 1100011 |
| 1101 | 1101110 |
| 1211 | 1111001 |
| 41 | 0000100 |
| 151 | 0001111 |
| 261 | 0011010 |
| 371 | 0100101 |

If it is desired to generate the second harmonic, then every other binary number of the above chart must be generated. It is to be understood that regardless of whether frequency $f_1$ or $Kf_1$ is generated to form a harmonic, the rate of generation of the binary numbers is the same, as shown in FIGS. 1*a* and 1*b*.

It is apparent from the frequency spectrum charts of FIGS. 1*c* and 1*d* that as the frequency of the signal being sampled increases while the sampling rate remains the same that the difference between the sampled frequency and its lower harmonic $f_s-f_1$ increases. Thus in FIG. 1*c* the difference between frequency $f_s$ and frequency $f_s-f_1$ can be seen to be considerably smaller than the difference between $f_s$ and frequency $f_s-f_k$ of FIG. 1*d*. The limiting factor in accordance with Nyquist's theory is that the sampling frequency should never become less than twice the sampled frequency. Thus $f_s$ should never be less than $2f_k$. If $f_s$ should become equal to, or less than $2f_k$, then the frequency $f_s-f_k$, represented by the line 104 in FIG. 1*d* would move to the left while the frequency $f_k$represented by the line 103, would in effect move to the right until the two would meet at the point where $f_s$ is equal to $2f_k$. If the sampling rate decreased further, then the two lines would cross and line 104 would move to the left of line 103 and crosstalk and distortion would occur.

Thus the highest possible harmonic that could be obtained would be the 63rd harmonic. If the 65th harmonic were attempted to be generated the frequency of the sampling rate would be equal to twice the frequency of the signal being generated and distortion and crosstalk would result.

It will also be noted that the frequency spectrums of FIGS. 1*c* and 1*d* are cyclical. More specifically, peaks that are the sum and difference of the sampled and sampling frequencies occur around each integral multiple of the sampling frequency. Thus, for example, in FIG. 1*c* the sum and difference frequencies of the sampling frequency $f_s$ and the sampled frequency $f_1$ occur around the fundamental sampling frequency $f_s$. At the second harmonic of the sampling frequency, $2f_s$, there occurs the sum and difference of the said second harmonic of the sampling frequency $2f_s$ and the sampled frequency $f_1$. A similar observation can be made in the frequency spectrum of FIG. 1*d*.

II—SINGLE TONE GENERATOR STRUCTURE

A. General Description

In FIG. 2 there is shown a basic logic diagram for generating a single tone, such as shown in FIG. 1*a*, by means of generating a series of binary numbers representing the phase increments of a cycle of said tone.

The full adder 120, the full adder 121 and the phase accumulator 122 form a circulating means for the generated phase words. The phase accumulator 122 is a seven stage shift register into which the 7-bit phase words, such as shown in Chart A above, are serially supplied and shifted therethrough under control of the output of clock pulse source 128. By appropriate timekeeping means designated generally by block 129, an AND gate 131 is caused to become conductive as each 7-bit phase word is entered into the phase accumulator 122, and supplies such phase word in parallel into phase-to-amplitude converter 123. The output of said phase-to-amplitude converter 123, which is now in the form of a binary word representing the amplitude of the sine wave at the corresponding phase position (and referred to herein as a sine magnitude word), is supplied to amplitude converter 124 which converts said sine magnitude word into a pulse whose energy content is proportional to the value of said sine magnitude word. In the embodiment shown, the pulse width is maintained constant while the amplitude changes. It will be realized by those skilled in the art that the output from 124 may vary in pulse width.

The output of said digital-to-amplitude converter 124 is then supplied to low pass filter 125 which produces the desired analog sine wave.

Returning now to the circulating loop 127, the circulation of the phase word therein is continuous and passes out of phase accumulator 122 at the same bit rate as they are supplied thereto. As can be seen from FIG. 2, the output of phase accumulator 122 is supplied to the input of full adder 120, the output of which is supplied to the second full adder 121. The full adder 120 performs the function of incrementing the phase words by a given increment each circulation thereof, thereby generating a tone. For example, if the tone being generated is the tone of FIG. *a*, then K, the increment value is equal to 1, so that the phase word is incremented by a value of one each circulation thereof to produce the complete series of binary words shown in Chart A above.

If K has a value of 11, then the $11^{th}$ harmonic of the tone FIG. 1*a* will be generated, which would be the tone of FIG. 1*b* which in turn is phase word represented by the digital words of Chart B above.

The adder 121 of FIG. 2 provides for a phase change of the tone being generated. More specifically, at each frame transition time a binary word, whose value is determined by the amount of phase shift desired, is supplied to full adder 121 coincident with the phase word being supplied thereto. It is to be understood that two different time references are now being discussed. The first time reference relates to the bit rate of the bits as they circulate in the circulating memory 127. The second time reference is a much slower time reference and is the period of a tone frame as discussed hereinbefore. To give an idea of the order of difference between these two timing rates without fully explaining them it can be said that the tone frame time is approximately 13.3 ms., and the rate at which bits are supplied to the phase accumulator is about 7 ×7040 Hz. or 49.28 kHz. Each bit circulates around the loop at a 7040 Hz. rate, which is the sampling rate.

Reference is made to FIGS. 5 and 6 wherein there is shown, both in vector diagram form and in chart form, the amount of phase shift required for the encoding of various permutations of bits in data channel 1 and data channel 2 onto the tone. The actual binary number required to be introduced into full adder 121 to produce a given phase shift is shown in Chart A above. For example, if a given received tone frame contains spaces in both channels 1 and 2 then said given received tone frame (phasor) should have a phase which is advanced 135° from the preceding phasor. Referring to chart of FIG. A, it can be seen that to provide an advance of 135° it is necessary to add the binary number 0110000, which equals 48, to the circulating phase word. Such addition is done in proper synchronism in full adder 121 in FIG. 2 through the input lead of $K_2$.

The phase-to-amplitude converter 123 can be any one of a number of circuits designed specifically to translate the phase representing binary words from accumulator 122 into binary words representing amplitude corresponding to such phase. One type of such translating circuits can be a matrix containing what amounts to a lookup table. More specifically, for each phase word supplied from accumulator 122 there is a fixed wire response in the form of a digital word representing amplitude.

Because of the cyclical nature of a sine wave, certain shortcuts in changing phase words to sine magnitude words can be effected. For example, it is apparent from the waveform of FIG. 1*a* that the sequence of digital words representing amplitude samples from 0° to 90° is the same as the sequence of digital words representing the amplitude sampling from 90° to 180°, but in reverse order. A similar relationship exists between the sequence of binary words representing amplitude samplings between 180° and 270° with the sequence representing amplitude samplings between 270° and 360°. Moreover, it can be seen that the samplings between 0° and 180° are the same as the amplitude samplings between 180° and 360° except that the polarity is reversed.

Keeping the foregoing relations in mind it can be seen that it is necessary that the phase-to-amplitude converting means be able to generate only the sequence of sine magnitude words corresponding to the phase words between 0° and 90°, along with indications of order of sequence and polarity. Then to generate the sequence of sine magnitude words corresponding to the phase words between 90° and 180° the matrix must be able to reverse the order of generation of the sequence of sine magnitude words corresponding to the phase words between 0° and 90°. The same process is followed in generating the sequence of sine magnitude words for the second half-cycle between 180° and 360° except that the polarities are all reversed.

The foregoing can be seen more clearly from the binary words in Chart A above. More specifically, the phase position of any 90° segment of the four 90° segments making up a sine wave cycle is determined by the five least significant bits of the 7-bit binary word of Chart A. The particular quadrant is determined by the two most significant bits, with the polarity of the first two quadrants, as opposed to the second two quadrants, being determined by the most significant bit. A "0" is indicative of the first two quadrants between 0° and 360°. The particular quadrant of the first two quadrants or the second two quadrants is determined by the second most significant bit, with a "1" representing the quadrant lying between 90° and 180° and the quadrant lying between 270° and 360°. The first and third quadrants are represented by a "0" in the second most significant bit position as shown in Chart A.

B. — Means For Translating Phase Words To Sine Magnitude Words

The detailed logic of the phase-to-amplitude converter 123 of FIG. 2 is shown in FIGS. 7 and 8 which fit together as shown in FIG. 9. In general the structure in FIG. 7 comprises logic which transforms the binary output of phase accumulator 122 into a sequence of binary words which count from 0 to 32 and then back down to 0, then up to 32 and back down to 0, for each cycle of the tone being represented. The count from 0 to 32, the first time it occurs, represents the first quadrant of the cycle of the sine wave, and the count from 32 back to 0, the first time it occurs, represents the second 90° of the sine wave. To differentiate between the first two quadrants and the last two quadrants of the sine wave there is provided the output of the most significant bit on lead 168 which changes from a 0 to a 1 at the 64th count of the phase accumulator for each 128 count cycle thereof, (where $K=1$).

In FIG. 7 the outputs of six stages of the phase accumulator 122′ are supplied in parallel through a bank of AND gates 151 into the six stages of shift register 152. The shift register 152 is a parallel input, serial output, or serial input, parallel output type shift register.

Each time a 7-bit phase word is shifted into accumulator 122′ a clock pulse is provided from source 150 which opens, i.e. makes conductive, the bank of AND gates 151 to transfer such phase word in parallel into the six stage shift register 152.

The output of said shift register is then supplied in parallel through the bank of AND gates 154 (FIG. 8) which are constructed so that only one of them will respond to any given output from the shift register 152. The foregoing will be explained in more detail in connection with the discussion of FIG. 8.

Returning again to FIG. 7 it will be noted that the output of shift register 152 will initially start from 0 and then count to 31 at which time the lease five significant bits will be "1's" and the two most significant bits will be "0's." At the count of 32 the first five significant bits will change to "0's" and the sixth least significant bit will change to a "1."

It is desired at this point to have the output of shift register 152 count back down to zero which function is accomplished in the following manner. When the sixth stage changes from a "0" to a "1," the AND gate 155 becomes conductive. The flip-flop 156 was previously set by the clock pulse which initially shifted the phase word from the accumulator 122′ into shift register 152. The output of AND gate 155 is detected by circuit 154 which responds thereto to set flip-flop 170, the output of which is supplied to input 157 of AND gate 158.

The clock source 159, which is running constantly, then supplies pulses through AND gate 158 to two destinations. One destination is into shift register 152 to cause shifting of the data therein through the 2's complement function 162 and back into the shift register 152 for reasons discussed below. The other destination is into counter 160 which counts up to six and permits six pulses to pass through AND gate 158 in the manner and for the purpose described below.

At the count of 6 the counter 160 produces an output which resets flip-flop 170, thus cutting off AND gate 158, and also resetting flip-flop 156 which cuts off AND gate 155, thereby completely disconnecting both the means 154 for detecting the condition of bit 6 in shift register 152, and the clock pulse source 159 from shift register 152.

At this point in time six clock pulses from source 159 have passed through AND gate 158 and have shifted the six bits stored in register 152 through the 2's complement function and then back into the input of shift register 152. However, in passing through the 2's complement function 162 the binary word which was originally stored in shift register 152 has had a 2's complement function performed thereon. A brief discussion of the nature and purpose of a 2's complement function will follow.

To transform a binary digit into a 2's complement the following general rule can be applied. Beginning with the least significant bit and working towards the most significant bit all bits up to and including the first "1" are left unchanged. All bits following the first "1," however, are changed. Specifically, "1's" are changed to "0's," and "0's" are changed to "1's." Thus when the binary digit 100000 (= 32) is shifted through the 2's complement function 162 the same binary digit 100000 is generated and supplied back into the shift register 152.

It should be noted that the shifting of a word of a phase word through the 2's complement function 162 occurs between two successive clock pulses $f_2$ from the source 150 and is, in fact, at the rate $7f_s$ generated by clock pulse source 159.

Following the binary word 100000 the next word supplied from phase accumulator 122' would be 100001 (=33). Again the sixth bit position is a "1" which activates detecting means 154, which in turn activates the 2's complement function 162 in the manner described above to produce in shift register 152 the resultant binary word 011111 (=31).

In a similar manner it can be shown that succeeding words supplied form phase accumulator 122', up to and including 111111 (= 63), will produce successively decreasing binary words at the output of the shift register 152 down to the binary word representing a "1."

The 64th absolute count of the phase accumulator will function to produce a "0" in the first six bit positions thereof and in all six bit positions of shift register 152. At this 64th count the 7th bit position of the phase accumulator will change from a "0" to a "1." This 7th bit position appears on output lead 168 and represents the sign (polarity) of the signal. More specifically, the 64th count represents the 180° mark of the sine wave cycle, at which time the sine wave changes polarity. Such change of polarity is noted by the change of the 7th bit from a "0" to a "1," which condition will exist during the second half-cycle of the generated tone when the phase accumulator 122' is counting in its first six bits position, back up to 63.

Thus at the output leads 167 of the circuit of FIG. 7 there is produced binary words which count from 0 to 32 and then back to 0 and then repeat the cycle for each 128 samplings occurring during a cycle of the sine wave.

The output leads 167 and the polarity indicating lead 168 of FIG. 7 are continued into FIG. 8. The six output leads 167' of FIG. 8 are then supplied to each of a group of 33 AND gates 554, of which only seven are shown. Each of these AND gates is responsive to a unique binary number ranging from 0 to 32 to produce a "1" at the output terminal thereof to indicate the reception of said unique binary word. Such output is then supplied to a matrix consisting of a bank of OR gates 169 and a matrix 570 of six AND gates identified by reference characters 171 through 176. The outputs of the first five AND gates represent amplitude of the sine wave in terms of a binary word with the output of AND gate 176 representing the least significant bit and the output of AND gate 172 the most significant binary bit. The output of AND gate 171 is a continuation of the sign bit from FIG. 7 and, as discussed above, is determined by the most significant bit of the output of the phase accumulator which is the 7th bit.

The operation of the circuit of FIG. 8 is as follows. Each binary word from FIG. 7 translates into a sine magnitude word in accordance with the chart of FIG. 4. For example, assume that the binary word 001110 (=14) is supplied from FIG. 7 into AND gate 182 of the group of gates 154 to produce an output from AND gate 182. Referring to FIG. 4 it can be seen that a phase word of value 14 has a sine magnitude value of 15. Returning again to FIG. 8 it can be seen that the output of AND gate 182 is supplied to OR gates 187, 188, 189, and 190, the outputs of which constitute the first four least significant bits of the 5-bit binary word output of OR gates 169. Thus "1" appear at the outputs of OR gates 187, 188, 189, and 190 to form a binary word equal to decimal 15. At the occurrence of a clock pulse $f_{c3}$ on lead 580 the AND gates 173, 174, 175, and 176, which are connected respectively to OR gates 188 through 190, will become conductive and produce "1" at their outputs. The AND gate 171 will remain nonconductive since the sign bit is "0."

As another example, assume that the output appearing on terminals 167 of phase word generator of FIG. 7 has a decimal value of 31. Consequently in FIG. 8 AND gate 184 will produce a "1" on its output terminal which is connected to OR gates 186, 188, 189, and 190 of the block of OR gates 169. The output of said OR gates are connected respectively to the five AND gates 172 through 176. At the occurrence of a clock pulse $f_{c3}$ on lead 580 the AND gates 172, 174, 175, and 176 will become conductive and produce "1" at their outputs which is equal to a decimal 23.

In a similar manner AND gates 180, 181, 183, and 185 can be seen to be connected to various combinations of the OR gates 169 to produce in the matrix 570 an appropriate sine magnitude binary digit in accordance with the chart of FIG. 4.

It is to be specifically noted that the 5-bit sine magnitude binary words appear at the outputs of the five AND gates 172 through 176 which are connected respectively to the outputs of OR gates 186 through 190, with the output of AND gate 176 representing the least significant bit of the 5-bit word and the output of AND gate 172 the most significant bit. The output of AND gate 171 is merely a continuation of the sign bit appearing on output lead 168 of FIG. 7.

The five bit sine magnitude binary word and the sign bit of FIG. 8 are supplied to the digital-to-analog converter 124 of FIG. 2 upon the appearance of a clock input pulse $f_{c3}$ supplied to input 180 of FIG. 8. Subsequently the said digital-to-analog converter 124 converts the sine magnitude signal into pulses upon the occurrence of gating signal $f_{c4}$,the derivation of which is shown in FIG. 10.

C. Timing Means For Single Tone Generator

Referring now specifically to FIG. 10 and 11 there is shown the logic for generating the several timing and synchronizing signals mentioned in connection with the discussion of FIG. 2, 7, and 8 and the relation of such signals to the outputs of the various blocks of FIG. 2. More specifically the logic shown in FIG. 10 produces the five timing signals $f_{c0}$, $f_{c2}$, $f_{c3}$, and $f_{c4}$, all of which are shown in the waveforms of FIGS. 11*a*, 11*b*, 11*d*, and 11*f*, respectively.

The basic clock timing source 590 is shown as having a frequency of 492.8 kHz. which is equal to 10 × 7 × the 7040 Hz. sampling frequency $f_s$. This basic timing source is somewhat different than that selected for the multitone generator for reasons that will become more apparent from a discussion of the multitone generator. When dealing with the single tone generator the basic consideration in selecting a basic clock pulse source is that it must be divisible by a multiple of seven times 7040 Hz.

The various timing signals of FIG. 11 relate to the structures of FIGS. 2, 8, and 9 in the following manner. Timing signal $f_{c2}$ is equal to $f_2$, and is, in fact, the sampling timing signal and functions as the marker for the shifting of the 7-bit phase word from the accumulator 122 of FIG. 2 into phase-to-amplitude converter 123. Such 7-bit accumulator word is shown symbolically in FIG. 11*c* by rectangular waveform 195.

Figure 3:
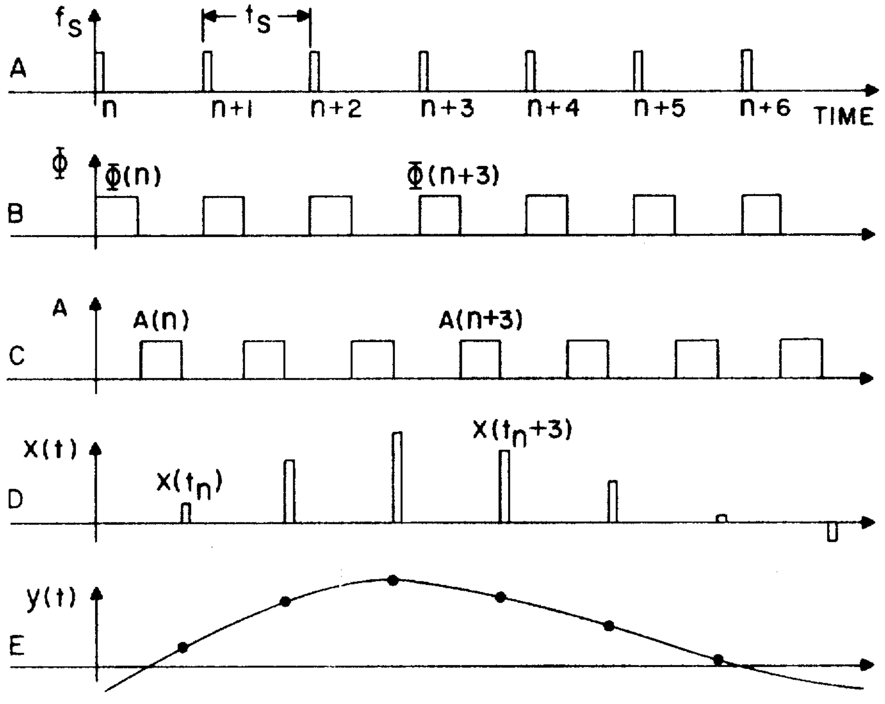
FIG. 3 is a series of waveforms showing the development of a tone from the initially generated binary words (phase words) representing phase angle to the final analog tone.

In the event that it is necessary to pass such 7-bit binary word through a 2's complement function the higher rate timing signal $f_{c0}$ is employed, as shown in FIG. 10*c*. The designated $1/f_{c0}$ is intended to represent the time between initial occurrences of $f_{c0}$ pulse. Such 2's complement function is completed well in advance of the occurrence of the timing signal 196 of FIG. 11*d*, which functions to shift the sine magnitude binary word out of the phase-to-amplitude converter 123 of FIG. 2 and into the digital-to-analog converter 124. The waveform 197 represents the time interval between the time that the digital-to-analog converter 124 receives the sine magnitude binary words and the time that it supplies a reset pulse. This signal is then fed to the low pass filter 125 of FIG. 2. The timing waveform of FIG. 11*g* is then the DAC 124 output to the LPF 125. The output of low pass filter 125 is represented by the waveform of FIG. 11*h*. Because of the expanded time scale, only a small portion of a cycle of a sine wave is shown in FIG. 11*h*. As will be realized. FIGS. 11*g* and *h* correspond respectively to FIGS. 3*d* and *e*. Thus, since FIG. 11*g* is not varying in amplitude at the time shown, 11*h*, is merely a straight line represented in this instance by a line of the same amplitude as the zero amplitude level of 11*g*. Specifically the frequency of the sine wave of FIG. 10*h* is equal to $f_1$, as shown in the waveform of FIG. 1*a*.

Referring again to FIG. 2, both digital-to-analog converters and low pass filters are well known in the art and will not be discussed in further detail herein. Any one of several types of digital-to-analog converters or low pass filters can be easily adapted by one skilled in the art to perform the function required in the circuit of FIG. 2.

III—MULTIPLE TONE GENERATOR

A. General Description

Referring now to FIG. 12 there is shown a general logic diagram for the multiple tone generator. This logic diagram of FIG. 12 is divided into several large sections defined by dotted blocks as follows:

1. Block 201 includes the circulating loop in which all of the phase words circulate once each sampling time ($1/f_s$).
2. A $K_1$ value generator 203 which functions to increment each phase word once each loop circulation to generate a desired tone frequency.
3. The block 200 for supplying a stream of data which is to be encoded into the library of tones being generated.
4. Block 239 which functions to respond to blocks of data bits from the incoming stream at each tone frame transition time to increment the phase words circulating in the loop by a binary count increment necessary to advance the phase thereof in accordance with the nature of the new pair of bits being encoded on each phase word.
5. Block 204 which includes all of the timing signal sources necessary to operate the structure and to synchronize the various portions thereof.
6. Block 205 which extracts the phase words from the circulating loop each circulation thereof and generates the composite analog tone therefrom.

The general operation of the structure is as follows. The circulating loop 201 comprises a 119-bit delay line shift register 213 which has a capacity to accommodate 17 seven bit words. Each of these words is circulated completely once around the loop every sample period, which sample period occurs 7040 times per second. To accomplish such a rate of circulation it is necessary that each bit of each word be stepped through the 119-bit shift register 213 at a rate equal to 7×17×7040 or 837.76 kHz. It is assumed that there is no delay in either full adder 211 or full adder 212.

The full adders 211 and 212 function in cooperation with other portions of the circuit to increment the binary value of the phase words as they circulate in the loop. However, the rate of at which such incrementation occurs in full adder 211 is quite different than the incrementation rate in full adder 212.

More specifically, full adder 211 functions to add a binary increment to each phase word each time it passes around the loop and in this manner generates a tone of a certain frequency as discussed in connection with the single tone generator. For example, if the $K_1$ increment is 1 each time a given phase word circulates in the loop, the tone generated is 55 Hz. If $K_1$ is equal to 2, then a tone of 110 Hz. is generated. Thus it can be seen that incrementation in full adder 211 occurs each circulation time in the loop or at the rate of 7040 Hz.

On the other hand, the full adder 212 is utilized to increment each phase word only at the frame transition time of the tones being generated. As has been mentioned above and as will be discussed in more detail later, the tone transition time occurs every 13.3 milliseconds, since the bit rate is 2400 bits per second and there are 16 tones each of which carries two bits. The value of 13.3 milliseconds is obtained by dividing 2400 by 32 which gives 75 groups of 32 bits per second, and then taking the reciprocal of 75.

It is to be noted that of the 17 phase words employed in the multiple tone system only 16 carry data. The first phase word, which is identified herein throughout as $\Phi_0$, is employed to correct for Doppler effect when the transmission of data involves a Doppler effect.

The Doppler effect tone $\Phi_0$ is not phase shifted at the tone frame transition time. Consequently, there is no $K_2$ factor added to $\Phi_0$ in full adder 212. However, since it is a tone and has a frequency of 55 Hz. in this particular tone library, it is necessary that $\Phi_0$ be incremented by one in full adder 211 each circulation of the loop.

The logic by which the phase word $\Phi_0$ is caused to pass through full adder 212 at the tone frame transition time without being incremented will be discussed at a later point herein.

It is to be noted that any group of tones of multiples of 55 can be selected to comprise a given family or library of tones.

A. 1. Generation of $K_1$ Increments

The matrix 224 functions to identify each phase word as it leaves the delay line shift register 213 in the circulating loop while the matrix 225 functions to identify each of the 7-bits of any given phase word.

The $K_1$ value generator 203 is responsive to the outputs of the matrices 224 and 225 to add a particular binary increment $K_1$ to each identified phase word as it passes through the full adder 211. For example, phase word $\Phi_1$ in this system is designated as having a frequency of 110 Hz. which requires that $K_1$ have a value of 2. The K value generator responds to the output of matrix 224, which identifies the phase word $\Phi_1$ as being the phase word $\Phi_1$, to prepare for the generation of a binary increment of 2. It is necessary, since phase word $\Phi_1$ consists of seven bits, that pulses be supplied via lead $K_1$ into full adder 211 coincident with the second least significant bit of phase $\Phi_1$, which is now circulating through full adder 211. This pulse supplied via $K_1$ at a time coincident with the passing of the second least significant bit of phase word $\Phi_1$ through full adder 211, will function to add the binary increment of 2 into phase word $\Phi_1$. Such incrementing of phase word $\Phi_1$ occurs once each circulation of phase word $\Phi_1$ around the loop to generate a tone of 110 Hz. in the manner described in detail in connection with the single tone generator.

Similarly, as another example, the phase word $\Phi_5$ has a frequency of 330 Hz. by definition in this embodiment of the invention. The matrix 224 identifies $\Phi_5$ as being the fifth phase word. The $K_1$ value generator 203 responds to such information from matrix 224 to prepare for the generation of a binary increment of 6, which involves the supplying of pulses into full adder 211 coincident with the second and the third least significant time slots of phase word $\Phi_5$. Such time slots are identified by matrix 225, which supplies such information to K value generator 203 where the information is used to generate the binary increment supplied to full adder 211.

A. 2. Generation of $K_2$ Increments

Every 13.3 milliseconds, which marks the end of a frame of the composite tone being generated, it is necessary to change the phase of each of the tones being generated. With respect to the phase words circulating in the loop 201 such change in phase is generated by the addition of a binary increment at the frame transition time.

As mentioned above, of the 17 tones being generated, 16 will have a phase change and such phase change will be entirely independent of the phase change of any of the other 15 tones. More specifically, for any given phase word the phase change required is determined by the two new bits about to be encoded on the phase of said tone.

At this point a general discussion of how the data bits entered into the system of FIG. 12 is in order. The data bits are supplied to the structure of FIG. 12 in a steady serial stream at a rate of 2400 bits per second. Such a data source is identified as block 220 in FIG. 12.

Since the system comprises 16 data carrying tones, with each tone being capable of carrying two bits per frame, it is apparent that each frame of the composite signal will contain 32 bits. Consequently, there is provided a 32-bit storage register 221 which receives the flow of bits from source 220 at the 2400 bit per second rate.

A counter 235 within the block 202 is constructed to respond to the 2400 Hz. clock pulse and to output a marker pulse every 32 clock pulses.

Thus in effect the 32 bit shift register 221 is first loaded with 32 bits, at which time the counter 235 provides an output pulse which performs the following functions.

1. The switch 236 is closed upon contact 238 to disconnect the 2400 Hz. clock pulse from input shift register 221 and in lieu thereof to connect the two-sevenths $f_0$ clock pulse source to shift register 221 in preparation for reading the contents of shift register 221 into the phase words of the loop 201.
2. Closes the switch 237 to enable the unload logic 239 to read and analyze the contents of the shift register 221 and generate binary increments which are added to the phase words circulating in loop 201 by means of full adder 212.

It is to be noted that the shift rate two-sevenths $f_0$ is a much higher frequency than the 2400 Hz. clock pulse since $f_0$ is 837.76 kHz. Consequently the entire contents of the 32 bits storage shift register 221 can be read in just a small fraction of one period of the 2400 Hz. clock rate. Thus the 32 bits in shift register 221 can be read every 13.3 milliseconds without any discontinuity in the flow of data bits into said shift register at the 2400 clock pulse rate.

While it was stated in the above discussion that the 2400 Hz. clock pulse source was disconnected from the shift register 221 during the unload period, such disconnect is not absolutely necessary because of the large differences in time frames involved.

The reading of the 32 bits stored into shift register 221 by unload logic circuit 239 is accomplished generally in the following manner. As discussed above, two bits can be encoded on each tone during each data frame. Thus a single phase shift of each phase word accomplishes the encoding of two bits on said phase word. The logic of circuit 239 is therefore designed to examine the 32 bits in the shift register 221 in pairs. More specifically, the logic circuit 239 examines the two bits in the 31st and 32nd stage of the 32-bit shift register 221. A binary number in accordance with the chart of FIG. 5 is generated by unload logic circuit 239 and is supplied via lead 241 to full adder 212, where it is combined with the proper phase word circulating in the loop. Assuming that the first phase word $\Phi_1$ is being updated by means of the timing circuit 204, the binary word generated by logic circuit 239 will be exactly time coincident with the 7-bit word $\Phi_1$ passing through full adder 212. The two binary numbers will be added in the full adder 212 to produce the desired phase shift.

The next phase word will be $_2$, and simultaneously with the passing of $\Phi_2$ into the full adder 212 there will be generated in logic circuit 239 a second binary word incrementing phase word $\Phi_2$ by the necessary increment.

At this point it is important to look at some of the details of the generation of said second increment in order to understand how the high speed shifting of data in the shift register 221 at the two-sevenths, $f_0$ rate is accomplished.

Since all of the phase changes occurring in full adder 212 are either 45°, 135°, 225°, or 315° only the three most significant digits of the 7-bit phase word will be changed. Under no circumstances will any of the four least significant bits be changed. Consequently, during the time slots corresponding to the first four least significant bits of the phase word $\Phi_2$ the next two bits in the shift register 221 can be shifted from the 29th and 30th stages of said shift register 221 into the last two stages, i.e. stages 31 and 32, so that said next two bits can be examined by the unload logic circuit 239 and the binary increment generated by said logic circuit 239 which will effect the necessary additions in the three most significant bits of phase word $\Phi_2$.

In a similar manner the remaining phase words $\Phi_3$ through $\Phi_{16}$ are updated. The entire updating function is accomplished in one circulation time of the loop 201, i.e. in 142 microseconds.

Means are provided, as will be shown in detail in FIG. 17, for disabling the unload logic circuit 239 and disconnecting the unload clock pulse block 223 from shift register 221 at the end of the 142 microsecond unload period. Then during the following 13.3 milliseconds (less 142 microseconds) the 32 bits shift register 221 will be filled up again with the next 32 bits from the data stream source 220.

A. 3. The Output Circuit

The output circuit is included within the dotted block 205 and comprises a 7-bit shift register 214, a phase-to-amplitude converter 215, an amplitude accumulator 216, a digital-to-analog converter 217, and a low pass filter 218.

The circulating data is continuously diverted from the loop 201 into the 7-bit shift register 214 in a serial manner. Timing means $f_w$ is provided which shifts each 7-bit phase word from the register 214 in parallel into the converter 215 as soon as word is completely entered into the register 214.

Reference is made to the waveforms of FIG. 13, and particularly to the waveforms *b*, *c*, *d*, and *e* in the Figure which show the time relationship of the occurrence of the various phase words as they circulate within the loop 201 and are entered into the 7-bit shift register 214. For example, at time $t_0$ the phase word $\Phi_0$ begins to be entered into shift register 214, and entry thereof is completed at time $t_1$, as shown in FIG. 13*c*. Also at time $t_1$ there occurs a clock pulse 290 as shown in FIG. 13*g* which functions to transfer the 7-bit phase word $\Phi_0$ in parallel form from shift register 214 into the converter 215.

In a similar manner at time $t_2$, when the phase word $\Phi_1$ has been completely entered into the shift register 214, a pulse 291 as shown in FIG. 12*g* will function to shift said phase word $\Phi_1$ into the phase-to-amplitude converter 215.

There is little or no delay between the input to the phase-to-amplitude converter 215 and the output thereof, as shown in FIG. 13*h*. Such output is actually binary words represented in 13*h* by variable amplitude lines representing the amplitude of the tone at the particular phase defined by the phase words supplied to the converter 215.

Returning again to FIG. 12 the outputs of converter 215 are accumulated in the amplitude accumulator 216, which is a digital device, as is the converter 215 and the shift register 214.

The amplitude accumulator 216 functions to accumulate all of the sine magnitude binary numbers outputted from the amplitude converter 215 during one complete circulation of the contents of the loop 201. Thus the amplitude accumulator 216 is, in fact, an adder which adds together all the binary numbers of the phase words $\Phi_0$ through $\Phi_{16}$ during one circulation of said phase words in the loop 201.

Such an accumulation of binary digits represent the amplitude of the composite signal at that point in time. A similar binary total is obtained for each and every other circulation of the phase words in the loop 201 to form a series of binary digits which define the composite tone being generated.

At the end of each circulation time of the data within the loop 201 the total binary number stored in the amplitude accumulator 216 is supplied to the digital-to-analog converter 217 where it is converted from a binary number to an analog value. The output of the digital-to-analog converter 217, which consists of a series of pulses of different amplitudes, is then supplied to the low pass filter 218 which function to extract the composite signal from the pulses supplied thereto.

The said composite signal then contains all of the 16 tones plus the Doppler tone generated digitally by the circuit of FIG. 12.

B. DETAILED DESCRIPTION OF MULTIPLE TONE GENERATOR

1 Timing Circuits and Generation of $K_1$ Tone Generating Count Increments

Referring now to FIG. 14 there is shown in some detail the $K_1$ value generator 203 and the timing circuit 204 of FIG. 12.

In FIG. 14 the basic timing signal source is an 837.76 kHz. signal represented by block 250 and designated as $f_0$. The output of block 250 is then supplied to a divide-by-7 circuit 251 and subsequently to a divide-by-17 circuit 252.

The output of the divide-by-7 circuit 251 has a frequency designated as $f_w$ and which provides word markers for the 7-bit words circulating in the loop 201 of FIG. 12. The output of the divide-by-17 circuit 252 provides the basic sampling frequency $f_s$ of 7040 Hz. which has a period $(1/f_s)$ of 142 microseconds.

Both the divide-by-7 circuit 251 and the divide-by-17 circuit 252 are constructed to have parallel output arrangements 263 and 262 which feed to matrices 254 and 253 respectively.

The matrix 254 has seven outputs, $T_1$, $T_2$, $T_4$, $T_8$, $T_{16}$, $T_{32}$, and $T_{64}$ which identify respectively the least significant to the most significant bit time slot of each seven bit phase word circulating in the loop 201 of FIG. 12 as it leaves the shift register 213.

The matrix 253 on the other hand has 17 outputs, $t_0$ through $t_{16}$, each of which functions to identify a given one of the phase words circulating in the loop. More specifically, on each of the output leads $t_0$ through $t_{16}$ will appear a pulse which is coincident with the time slot occupied by one of the 17 phase words circulating in the loop.

Thus the pulse appearing on output lead $t_1$ of matrix 253 for example will be time coincident with the 7 bits of phase word $\Phi_1$ during the time the phase word $\Phi_1$ is circulating around the loop outside of the storage shift register 213 of FIG. 12.

It can be seen from the foregoing discussion that the timing circuitry of FIG. 14 and waveforms of FIG. 13 not only provide basic timing signals for the sampling rate and the shifting of bits through the shift register 213 of the loop but also function to delineate and identify the time slots occupied by each word and the time slots occupied by each bit of each word.

The foregoing time slot identification means are used for several purposes in the circuit. One such purpose is in the generation of the $K_1$ values. The logic for the generation of such $K_1$ values is also shown in FIG. 14 and comprises, essentially, AND gates 255, 256, 258, 260 and OR gates such as OR gates 257 and 259.

It is to be understood that the gates mentioned in the previous paragraph function to provide $K_1$ values for only four of the tones. The generation of the $K_1$ values for the remaining 13 tones is not specifically shown in FIG. 14. However, such logic will be apparent to one skilled in the art from the four specific logic circuits shown in FIG. 14.

As an example of the generation of a $K_1$ value, consider the function of AND gate 255 which is employed in generating the $K_1$ value for the $\Phi_0$ tone. The output $t_0$ of matrix 253 is connected to the lower input 271 of AND gate 255 which prepares said AND gate 255 to be conductive during the entire time interval that phase word $\Phi_0$ is circulating in the loop 201 of FIG. 12.

Also supplied to AND gate 255 is the output $T_1$ from the matrix 254, which output is a pulse that is time coincident with the time slot of the least significant bit of the phase word. Reference is made to FIG. 13$f$ wherein the designations $T_1$, $T_2$, $T_4$, $T_8$, $T_{16}$, $T_{32}$, and $T_{64}$ are shown to define the time slots of the bits of a phase word.

Returning again to FIG. 14 it can be seen from the foregoing that during the coincidence of the pulses $t_0$ and $T_1$ the AND gate 255 will supply an output pulse coincident with the least significant bit of the phase word $\Phi_0$. In essence this output pulse is a binary word having a decimal value of 1, as indicated at the output of AND gate 255. Such binary word is then supplied to full adder 211 as shown in FIG. 12 where it is added to the phase word $\Phi_0$.

In a similar manner the AND gate 256 generates a binary increment of 2 since the inputs to AND gate 256 is the output $T_2$ from matrix 254.

A case where the combination of two outputs from matrix 254 is required is shown in connection with AND gate 258 where it is necessary to generate a binary increment of 3 for the phase tone $\Phi_2$. The binary increment 3 involves pulses generated during the first and second least significant bits positions of the phase word $\Phi_2$. To effect such a result the outputs on $T_1$ and $T_2$ of matrix 254 are supplied through OR gate 257 to AND gate 258 which thereupon responds to produce the desired binary increment. It is to be noted that the other input to AND gate 258 is $t_2$ from matrix 253 which conditions AND gate 258 to be conductive during the duration of the phase word $\Phi_2$.

As a fourth example, consider AND gate 260 which supplies a binary increment of 15 to phase tone $\Phi_{14}$. In this example OR gate 259, which has inputs from output terminals $T_1$, $T_2$, $T_4$, and $T_8$, is required to supply the necessary pulses to AND gate 260.

B. 2. GENERATION OF $K_2$ PHASE SHIFTING COUNT INCREMENTS a. Low Speed Shifting of Data Into Input Storage Register

Referring now to FIG. 17 there is shown a somewhat more detailed diagram of the diagram shown in 12. More specifically in FIG. 17 there are shown more details of the circulating loop and the means for generating the $K_2$ value.

The correspondence between FIG. 12 and FIG. 17 with respect to the means for generating the $K_2$ values are as follows:

| FIG. 12 | FIG. 17 |
|---|---|
| Block 222 | Block 317 |
| Blocks 223 and 219 | Block 316 |
| Block 235 | Block 342 |

Consider first the logic within the block 316 of FIG. 17 which contains the control means for gating either the 2400 Hz. clock pulse or the two-sevenths $f_0$ clock pulse to the input storage shift register 315.

As discussed above, when the shift register 315 is being loaded with 32 bits from the data stream source 300, the rate of shifting of such data into the shift register 315 is 2400 bits per second. Such 2400 Hz. clock pulses are supplied via input lead 341 to AND gate 324 in FIG. 17. At this time, as will be discussed in more detail later, the output of the $\Delta\Phi$ generator 342 is a "0". Such "0" is inverted by inverter 327 to enable AND gate 324 to pass said 2400 Hz. clock pulses therethrough and then through OR gate 323 to shift the data into shift register 315 from source 300 at the 2400 Hz. rate. When 32 bits have been supplied to shift register 315, it becomes full and is ready to be analyzed and read by logic circuit 317.

A means is provided which indicates that shift register 315 has received 32 bits and is full. Such means is the $\Delta\Phi$ generator 342 which contains a 32 count counter. At the count of 32 the generator 342 will deliver a 142 microsecond pulse on its output terminal 307. Such 142 microsecond pulse, identified herein as the $\Delta\Phi$ pulse is supplied to three logic circuits. Specifically it is supplied to AND gate 340, to AND gate 326 and, to AND gate 324 via inverter 327. By virtue of said $\Delta\Phi$ pulse and the function of inverter 327 AND gate 324 is made nonconductive, thus blocking any further 2400 Hz. serial clock pulses from passing therethrough for the duration of the $\Delta\Phi$ pulse.

Said $\Delta\Phi$ pulse also functions to open, i.e. make conductive, AND gates 306 and 326. The opening of AND gate 326 permits the $T_2$ and $T_8$ pulses on leads 350 and 351 to pass through OR gate 328, AND gate 326, and OR gate 323 to unload the data in serial manner from shift register 315, one stage upon each occurrence of either a $T_2$ and $T_8$ pulse.

It will be recalled that the $T_2$ and $T_8$ pulses are generated by the matrix 225 of FIG. 12, which is shown in more detail as the matrix 251 of FIG. 14. Since the basic T pulses occur at the $f_0$ rate and further since two of them, $T_2$ and $T_8$, are being utilized to shift the data into register 315 of FIG. 17, it follows that the shift rate of the register 215 is two-sevenths $f_0$.

The reason why the pulses $T_2$ and $T_8$ can be utilized to shift the data in register 215 has been discussed hereinbefore generally. A more thorough understanding of the usage of the $T_2$ and $T_8$ pulses for shift register purposes will be had from the following section.

B. 2. *b*. High Speed Readout and Analysis of Data Bits Stored in 32-Bit Input Storage Register The logic within the dotted block 317 functions to read the pairs of data bits stored in the last two stages 308 of shift register 315. Since the data in the shift register 315 is now being shifted forward therein at a rate two-sevenths $f_0$, it follows that the logic circuit 317 will read a pair of bits from the last stage 308 of shift register 315 at a rate one-seventh $f_0$, which is equal to $f_r$, the rate of circulation of the phase word in the loop 314.

As discussed generally above, the phase changes made in each phase word are limited to one of four discrete phase changes. These phase changes are 45°, 135°, 225°, or 315°. The least phase change that will be made involves a count increment of 16. More specifically, 16 counts are added to a phase word in order to advance that phase word 45°. It is apparent that only the three most significant bits of each phase word are involved in making any of the four phase changes employed in a $K_2$ incrementing operation. Since the four least significant bits of each phase word are not involved in such phase changes, the time slots corresponding to the first four least significant bits of each phase word can be utilized for some other purpose. Such other purpose is the unloading of the data in the shift register 315 in between the reading of each pair of data bits read from the last two stages 308 of register 315.

Thus, for example, immediately after the shift register 315 is loaded with 32 bits, an analysis of the 32 bits is initiated by the generation of a $\Delta\Phi$ pulse from source 342. The following operation occurs. The two data bits stored in the last two stages 308 of shift register 315 are analyzed by logic circuit 317 and a binary increment, determined by the nature of said last two data bits, is generated by logic circuit 317 and supplied to full adder 314 synchronously, bit for bit, with the first data containing phase word $\Phi_1$. The amount of the binary increment is thereby added to the phase word $\Phi_1$ in full adder 314 and then passed therethrough back to the shift register 311, and also in parallel into the output shift register 310.

The next four bit time slots corresponding to the first four positions of the next phase word $\Phi_2$, as discussed above, are not utilized in advancing the phase of the tone. Consequently, during the time that the first four bits of said next phase word $\Phi_2$ are passing through full adder 314 the data in the shift register 315 can be advanced two stages so that the next pair of bits can be shifted from the 29th and 30th stages 307 into the last pair of stages 308 of register 315. Specifically the shifting of such bits occurs in response to pulses $T_2$ and $T_8$ generated at the output of matrix 254 of FIG. 14.

Thus by the time the last three most significant digits of the phase word pass through the full adder 314 the logic circuit 317 will have analyzed the two new bits in the last two stages of shift register 315 and will generate the necessary pulses time coincident with the last three bits of the phase word $\Phi_2$.

Consider a specific example. Assume that the two new bits supplied to the last two stages of register 315 constitute a mark in channel 2 and a space in channel 1. Reference to the chart of FIG. 5 and the vector diagram of FIG. 6 shows that this condition requires an advance of phase word $\Phi_1$ by 225°, which, in terms of binary increment is equal to 80. To obtain the increment of 80 requires the combination of the binary increments of 64 and 16, as shown in the chart of FIG. 5.

The mark in channel 2 supplies a "1" to one input of AND gate 394 of FIG. 17 and conditions said AND gate 394 to be conductive upon the occurrence of bit timing pulse $T_{64}$. Thus when $T_{64}$ is generated by the matrix 254 of FIG. 14, an output pulse will be generated from AND gate 394 which will pass through OR gate 395, OR gate 322, and through the then conductive AND gate 306 to full adder 314. Such pulse will be time coincident with the most significant with the most significant bit of the phase word $\Phi_1$ and will in effect add the count of 64 thereto.

The count of 16 is added to the phase word $\Phi_1$ two bit times earlier, however, and occurs in the following fashion. When the pulse $T_{16}$ is generated by the matrix 254 of FIG. 14 it passes through the OR gate 322 of FIG. 17, through conductive AND gate 306, and into full adder 314. Since said pulse $T_{16}$ is time coincident with the third most significant bit of the phase word $\Phi_1$ it will add a count increment of 16 to said word.

Thus the phase word $\Phi_1$ has had added thereto, in full adder 314, a total of 80 counts which, as can be seen from the chart of FIG. 6, constitutes a phase advance of 225°.

It is to be noted that the binary code 32 is added from FIG. 5 whenever the data on the two channels is the same. This is accomplished through the exclusive OR gate 329.

The process then repeats. More specifically the phase word $\Phi_2$ is the next phase word to be flowing into the full adder 314 and again the first four bits thereof are not employed in any phase change required. Thus, the time intervals corresponding to these first four bits are again utilized to advance the data in the shift register 315 two stages in preparation for examination of the next pair of bits by the logic circuit 317.

It is apparent from the foregoing that all 16 pairs of bits in the shift register 315 are analyzed during one circulation of the data in the loop which involves a time interval of 142 microseconds. At the end of said 142 microseconds the $\Delta\Phi$ pulse generated by generator 342 terminates. A more detailed discussion of the $\Delta\Phi$ generator 342 follows.

B. 2. *c*. Generation of Gating Pulse $\Delta\Phi$ For Unloading Input Shift Register Reference is made to FIG. 15 wherein the 2400 Hz. serial clock is supplied to a 32 count counter 360 via input lead 361. At the count of 32, which indicates a fill-up of shift register 315 of FIG. 17, the counter 360 outputs a signal to set flip-flop 362. Assume that said output pulse occurs at time $t_0$, as shown in the waveform of FIG. 16a. The flip-flop 362 will then have a "1" on its output lead 367 which is supplied to the set side of flip-flop 364. At the occurrence of the next sampling pulse $f_s$, which occurs at time $t_1$ and is identified as pulse 368 in FIG. 16b, two functions occur. Firstly, the flip-flop 364 is set so that the pulse $\Delta\Phi$ is produced on its output lead 366. Secondly, the flip-flop 362 is reset via feedback lead 363.

At the occurrence of the next $f_s$ pulse at time $t_2$ and as identified by reference character 369 in waveform 16d, the flip-flop 364 is reset via feedback lead 365 to terminate the $\Delta\Phi$ pulse as shown at time $t_2$ in the waveform of FIG. 16d.

Thus it can be seen in the waveform of FIG. 16d that the $\Delta$ pulse is initiated at time $t_1$ and terminated at time $t_2$, 142 microseconds later. It is during this 142 microsecond period that the 32 bits in the shift register 315 are advanced at the two-sevenths $f_0$ rate and are analyzed by logic circuit 317 in FIG. 17 and the results thereof employed to advance the phase of the phase words $\Phi_1$ to $\Phi_{16}$.

As mentioned above, the phase word $\Phi_0$ is for purposes of Doppler correction and the phase thereof is not changed at tone frame transition times. To prevent any change of phase therein there is provided in FIG. 17 the Inhibit AND gate 353 which is positioned between the output of AND gate 340 and the full adder 314. During the time that the phase word $\Phi_0$ is circulating in the loop an input pulse $t_0$ is supplied to said Inhibit AND gate 353 and functions to block any output of the logic circuit 317 from being supplied to full adder 314. At all other times, i.e. during the circulation of phase words $\Phi_1$ through $\Phi_{16}$ in the loop, the Inhibit AND gate 353 in conductive.

A similar type Inhibit AND gate can be placed in the inputs $T_2$ and $T_8$ of OR gate 328 to prevent the supplying of said pulses $T_2$ and $T_8$ to input storage shift register 315 during the circulation of phase words $\Phi_0$ and $\Phi_1$, thereupon preventing the advance of the data bits stored in said shift register 315 during the time interval that phase words $\Phi_0$ and $\Phi_1$ are circulating in the loop. Thus the first load pulses are supplied to register 315 during phase word $\Phi_1$.

B. 3. Phase-to-Amplitude Binary Word Conversion

Referring now to FIG. 18 there is shown in more detail the output circuit 330 of FIG. 17.

In FIG. 18 the 7-bit shift register phase accumulator 400 corresponds to the 7-bit shift register 310 of FIG. 17 and into which the data circulating in the loop is supplied serially at the $f_0$ rate.

As in the case of the single tone generator, the ultimate objective of the output circuit of FIG. 18 is to translate each phase word into an amplitude equivalent. In the multiple tone generator of FIG. 17, however, all of the amplitude signals are combined to form a resultant composite analog signal containing the 17 tones.

The generation of the amplitude indicating digital word from a phase word is the same, however, for the multiple tone generator as it is for the single tone. The principal difference is that the multiple tone generator involves 17 tones whereas the single tone generator involves only a single tone.

As in the case of the single tone, the amplitude of each tone of the multiple tone generator in essence repeats itself in each of the four quadrants of a complete cycle. More specifically the first half-cycle amplitude samplings are identical to those in the last half-cycle, but of opposite polarity.

Further, the amplitude of the samplings of the first quadrant are a mirror image of the amplitude samplings of the second quadrant. A similar relation exists between the third and fourth quadrants of a cycle.

In the manner discussed in detail in connection with the single tone generator the phase words occurring in the second and fourth quadrants of a cycle of a given tone are passed through a 2's complement function to provide a mirror image relation with the phase words in the first and third quadrants. The quadrant in which any phase word lies is determined by the sixth bit, i.e. the second most significant bit of each phase word. MOre specifically when said such sixth bit is a "1," the phase word lies in either the second or fourth quadrant, and when it is a "0," the phase word lies in either the first or third quadrant. The seventh or most significant bit of the phase word determines whether the phase word lies in the first half or the last half of the cycle and thus determines the polarity of the amplitude signal to be generated.

The means by which the necessity for the 2's complement function is detected in FIG. 18, and the means by which the 2's complement function is carried out is different from that employed with the single tone generator. Such different means is not one of necessity but is employed only to illustrate an alternative method of detecting and implementing the 2's complement function.

The operation of the circuit of FIG. 18 is as follows. The data from the circulating loop is supplied serially into the 7-bit shift register phase accumulator 400 and then serially into the 7-bit shift register 403, both of which shift under control of the $f_0$ input pulses applied to input lead 410.

The reason for the second shift register 403 is as follows. As a word is entered into the first shift register 400, means are provided which detect the second most significant bit stored in stage 404 to determine if the word stored at the instant in shift register 400 should be passed through a 2's complement function. If said sixth bit is a "1," then the switching arrangement enclosed within dotted block 401 responds thereto to pass the data serially from shift register 400 through AND gate 407, 2's complement function 409 and then through OR gate 402 into shift register 403. On the other hand, if the sixth bit of the word stored in shift register 400 is a "0," indicating that the 2's complement function should not be performed on that word, then such phase word is passed directly through AND gate 406 and OR gate 402 into shift register 403.

Switch 401 contains, in addition to AND gates 406 and 407, an inverter 405 which supplies the sixth bit directly to an input of AND gate 406. The output of the sixth bit position 404 is supplied also directly to AND gate 407. When a 7-bit phase word has been completely entered into the shift register 400, a word marker $f_w$ is supplied to input 408 within switch 401 which functions to open gate 406 or 407 depending upon the content of stage 404 of shift register 400. If the content thereof is a "1," then AND gate 407 is open, i.e. conductive and conversely AND gate 406 is not conductive due to the action of inverter 405. Under these conditions the word stored in shift register 404 will be passed through 2's complement function 409.

On the other hand, if the second most significant bit sorted in stage 404 of shift register 400 is a "0," then AND gate 407 is not conductive and AND gate 406 is conductive. Under these conditions the word stored in shift register 400 will not be passed through 2's complement function 409. Each of the phase words $\Phi_0$ through $\Phi_{16}$ are in turn processed through the switch 401 and into the 7-bit shift register 403.

Also at the occurrence of the word marker $f_w$ the contents of the shift register 403 is transferred in parallel through leads 412 to phase-to-amplitude converter 413. It will be noted that at the time of the transfer of a word from shift register 403 to the phase-to-amplitude converter 413 two full word periods have transpired since such word was circulating in the loop.

Such timing relationship can be more clearly seen from waveforms of FIG. 19. More specifically the waveforms 19*a* and 19*c* show the time relationship of the content of a given phase word in the shift registers 400 and 403 respectively. The waveform *d* of FIG. 19 shows the time relationship of the contents of the phase-to-amplitude converter 413 with respect to the corresponding phase word as it was stored in shift register 400 or 403.

The phase-to-amplitude converter 413 can be the same as is shown in detail in FIG. 8 with the input leads 412 of FIG. 18 corresponding to the input leads 167 of FIG. 8 and the output leads 414 of FIG. 18 corresponding to the output leads 399 of FIG. 8.

Each of the 17 sine amplitude binary words generated in the converter 413 during one pass of the data around the loop is supplied to an amplitude accumulator 415 which functions to add all of the 17 amplitude indicating words together to provide a cumulative amplitude indicating binary word as shown in waveform e of FIG. 19. Such cumulative sine amplitude word is then supplied from accumulator 415 in parallel through leads 417 to a digital-to-analog converter 418 which functions to convert binary words into analog pulses, which also occurs once every 17 phase words, i.e. at the sampling rate $f_s$.

A low pass filter 419 functions to extract the composite signal from the analog pulses supplied thereto by digital-to-analog converter 418.

It is to be understood that the forms of the invention shown and described herein are but preferred embodiments thereof, and that many changes can be made therein without departing from the spirit or the scope of the invention. For example, the output shift register 310 of FIG. 17 is shown as lying outside the circulating loop, i.e. in parallel with the main storage delay line shift register 311. It is possible, however, to incorporate the output shift register 310 in the circulating loop, in which case it would be necessary to change the relation of some of the frequencies. More specifically there would now be an equivalent of 18 7-bit shift registers in the loop so that $f_0$ would become equal to 7×18×7040 or 887.04 kHz. Similarly with certain types of circuitry the full adders 313 and 314 will have some delay. Such delay would require additional changes in frequency relationships. However, all of these changes are well within the scope of one skilled in the art and can be incorporated in the invention as a result of the teachings herein without the exercise of invention.

I claim:

1. Digitalized tone generating means comprising, in combination:

closed loop circuit means for circulating therearound, at a circulating rate $f_s$, at least one phase word comprises of a serial stream of M data bits, and comprising:

delay line means constructed to shift said data bits therealong in response to clock pulses supplied thereto at a rate $f_0$;

and first incrementing means connected in series with said delay line means;

clock pulse source means having an output signal supplied to said delay line means to shift data bits therethrough at said $f_0$ rate;

said first incrementing means constructed to generate a binary increment $K_1$ each $N^{th}$ circulation of said phase word around said closed loop circuit means and to add said binary increments $K_1$ to said circulating phase word to produce a sequence of binary words circulating in said closed loop circuit means, each binary word having a value representing a specific phase angle of the tone being generated;

output means constructed to receive each binary word each $R^{th}$ circulation thereof in said closed loop circuit means, where R is an integer of a value at least as great as one; and converting means responsive to each of said binary words received in said output means to generate a signal representative of that amplitude of the tone being generated which corresponds to the phase angle represented by said each binary word.

2. Digitalized tone generating means in accordance with claim 1 comprising:

counting means responsive to the output pulses from said clock pulse source means to produce a first output signal which counts and identifies the time slot of each of said M data bits of said phase word as said each data bit enters said first incrementing means:

and in which said first incrementing means is responsive to said first output signal of said counting means to add each bit of said binary increment $K_1$ to each bit of corresponding order of magnitude of said phase word as it enters said first incrementing means.

3. Digitalized tone generating means in accordance with claim 1 and comprising:

second incrementing means connected in series with said delay line means and said first incrementing means in said closed loop circuit means;

said second incrementing means responsive to the data from said source of input data to generate a second binary increment $K_2$ having a value that is determined in accordance with the nature of said input data and to add said second binary increment $K_2$ to said circulating phase word to advance the phase of the tone represented by said phase word, which is comprised of said sequence eof binary words.

4. Digitalized tone generating means in accordance with claim 3 comprising:

counting means responsive to the output pulses from said clock pulse source means to produce a first output signal which counts and identifies the time slot of each of said M data bits of said phase word as said each data bit enters said first incrementing means;

and in which said first incrementing means is responsive to said first output signal of said counting means to add each bit of said binary increment $K_1$ to each bit of corresponding order of magnitude of said phase word as it enters said first incrementing means.

5. Digitalized tone generating means in accordance with claim 4 in which:

said counting means is further responsive to the output pulses from said clock pulse source to produce a second output signal which counts and identifies each of the M data bits of said phase words as said data bits enter said second increment generating means;

and in which said second incrementing means is responsive to said second output signal of said counting means to add each bit of said binary increment $K_2$ to the bit of corresponding order of magnitude of said phase word as it enters said second incrementing means.

6. Digitalized tone generating means in accordance with claim 1 in which said delay line means has a capacity to hold at least two of said phase words and comprising:

counting means responsive to the output pulses from said clock pulse source means to identify each of said phase words as it circulates within said closed loop circuit means and to identify the time slot occupied by each bit of each word as said bits circulate in said closed loop circuit means.

7. Digitalized tone generating means in accordance with claim 6 in which said first incrementing means is constructed to respond to a first output signal of said counting means to add a unique and different binary increment $K_1$ to each of said two or more phase words as said two or more phase words circulate through said closed loop circuit means and through said first incrementing means.

8. Digitalized tone generating means in accordance with claim 7 and comprising:

second incrementing means connected in series with said delay line means and said first incrementing means in said closed loop circuit means;

said second incrementing means responsive to the data from said source of input data to generate for each of said two or more phase words, at predetermined periodic intervals, a corresponding second binary increment $K_2$ having a value that is determined in accordance with the nature of said input data, and to add said second binary increments $K_2$ to said circulating phase words to advance the phase of the tones represented by said phase words, which are each comprised of one of said sequence of binary words.

9. Digitalized tone generating means in accordance with claim 8 in which:

said counting means is further responsive to the output pulse from said clock pulse source to produce a second output signal which counts and identifies each of the M data bits of said phase words as said data bits enter said second incrementing means;

and in which said second incrementing means is responsive to said second output signal of said counting means to add each bit of each binary increment $K_2$ to the bit of corresponding order of magnitude of the corresponding phase word as it enters said second incrementing means.

10. Digitalized tone generating means in accordance with claim 7 comprising:

data storage means for receiving and storing said input data bits at a rate of S bits per second until T bits have been received, where T is the number of bits to be encoded on the tones being generated;

gating means responsive to the storing of T bits in said data storage means and further responsive to the output signal of said clock pulse source means to read and analyze the T data bits stored in said data storage means and to generate a series of second binary words, one for each tone being generated, at a rate equal to the multiplexing rate of said phase words circulating in said closed loop circuit means; successive ones of said second binary words being bit synchronized with predetermined successive ones of said circulating phase words;

said second adding means constructed to add each of said series of second binary words to the time corresponding circulating phase word to produce a phase shift in each phase word in accordance with the value of the second binary word added thereto.

11. Digitalized tone generating means comprising:

closed loop circuit means for circulating a stream of tone representing data bits in serial manner therearound and comprising:

delay line means constructed to shift data bits therealong in response to clock pulses supplied thereto; and first increment generating means connected in series with said delay line means;

clock pulse source means having its output signal supplied to said delay line means to shift data bits therethrough at a predetermined rate $f_0$;

said first increment generating means constructed to generate and to add a binary increment $K_1$ to said stream of data bits each $N^{th}$ circulation thereof in said closed loop circuit means; and output storage means constructed to receive said stream of data bits each $R^{th}$ circulation thereof in said closed loop circuit means;

converting means responsive to each occurrence of reception of said stream of data bits in said output storage means to generate a series of signals each having a magnitude A determined by the binary value X of the stream of data bits from which it was derived and in accordance with the expression $A=f(X)$.

12. Digitalized tone generating means in accordance with claim 11 comprising:

counting means responsive to the output pulses from said clock pulse source to produce a first output signal which counts and identifies the time slot of each bit of said stream of data bits as said each bit enters said first increment generating means;

and in which said first increment generating means is responsive to said first output signal off said counting means to add each bit of said binary increment $K_1$ to a bit of corresponding order of magnitude of said stream of data bits as said bits enter said first incrementing means.

13. Digitalized tone generating means in accordance with claim 11 and comprising:

second incrementing means connected in series with said delay line means and said first incrementing means in said closed loop circuit means;

a source of input data;

said second incrementing means responsive to the data from said source of input data to generate a second binary increment $K_2$ having a value that is varied and determined in accordance with the nature of said input data, and to add said second binary increment $K_2$ to said circulating stream of data bits at predetermined tine intervals to advance the phase of the tone represented thereby by an amount determined by the value of said binary increment $K_2$.

14. Digitalized tone generating means in accordance with claim 13 comprising:

counting means responsive to the output pulses from said clock pulse source to produce a first output signal which counts and identifies the time slot of each of said bits of said stream of data bits as said each bit enters said first increment generating means;

and in which said first increment generating means is responsive to said first output signal of said counting means to add each bit of said binary increment $K_1$ to each bit of a corresponding order of magnitude of said stream of data bits as they enter said first increment generating means.

15. Digitalized tone generating means in accordance with claim 14 in which:

said counting means is further responsive to the output pulses from said clock pulses to produce a second output signal which counts and identifies each bit of said stream of data bits as each of said bits enter said second increment generating means;

and in which said second increment generating means is responsive to said second output signal of said counting means to add each bit of said binary increment $K_2$ to the bit of corresponding order of magnitude of said stream of data bits as said bits enter said second increment generating means.

16. Digitalized tone generating means in accordance with claim 11 in which said delay line means has a capacity to hold at least two of said phase words and comprising:

counting means responsive to the output pulses from said clock pulse source means to identify each of said phase words as it circulates within said closed loop circuit means and to identify the time slot occupied by each bit of each word as said bits circulate in said closed loop circuit means.

17. Digitalized tone generating means in accordance with claim 16 in which said first increment generating means is constructed to respond to a first output signal of said counting means to add a unique and different binary increment $K_1$ to each of said two or more phase words as said two or more phase words circulate through said closed loop circuit means and through said first incrementing means.

18. Digitalized tone generating means in accordance with claim 17 and comprising:

second incrementing means connected in series with said delay line means and said first incrementing means in said closed loop circuit means;

a source of input data;

said second incrementing means responsive to the incoming data from said source of input data to generate for each of said two or more binary words, at predetermined periodic intervals, a second binary increment $K_2$ having a value that is determined in accordance with the nature of said input data, and to add said second binary increment $K_2$ to the time corresponding circulating binary word to advance the phase of the tone represented by said time corresponding binary word by an amount determined by the value of said binary increment $K_2$.

19. Digitalized tone generating means in accordance with claim 18 in which:

said counting means is further responsive to the output pulses from said clock pulses to produce a second output signal which counts and identifies each of the bits of said binary words as said bits enter said second increment generating means;

and in which said second increment generating means is responsive to said second output signal of said counting means to add each bit of said binary increment $K_2$ to the bit of corresponding order of magnitude of said time corresponding binary word as it enters said second increment generating means.

20. Digitalized tone generating means in accordance with claim 17 comprising:

data storage means for receiving and storing said input data bits at a rate of S bits per second until T bits have been received, where T is the number of bits that can be encoded on the tones being generated;

gating means responsive to the storing of T bits in said data storage means and further responsive to the output signal of said clock means to read and analyze the T data bits stored in said data storage means and to generate a series of second binary words, one for each tone being generated, at a rate equal to the circulation rate of said binary words circulating in said closed loop circuit means; successive ones of said second binary words being bit synchronized with predetermined successive ones of said circulating binary words;

said second adding means constructed to add each of said series of second binary words to the time corresponding circulating binary word to produce a phase shift in each circulating binary word in accordance with the value of the second binary word added thereto.

21. Digitalized tone generating means comprising:

a closed loop circuit means for circulating therearound at least one phase word comprised of a serial stream of M data bits and comprising:

delay line means constructed to shift data bits therealong in response to clock pulses supplied thereto; and first adding means connected in series with said delay line means;

clock pulse source means having its output signal supplied to said delay line means to shift data bits therethrough at a predetermined rate $f_0$;

first increment generating means constructed to generate and to supply a binary increment $K_1$ to said first adding means each $N^{th}$ circulation of said phase word in said closed loop circuit means;

said first adding means constructed to add together said phase word and said binary increment $K_1$;

output storage means constructed to receive each phase word each $R^{th}$ circulation thereof in said closed loop circuit means;

converting means responsive to said phase words in said output storage means to generate a signal representative of the amplitude of said tone being generated corresponding to the phase magnitude of said phase word.

22. Digitalized tone generating means in accordance with claim 21 comprising:

counting means responsive to the output pulses from said clock pulse source to produce a first output signal which counts and identifies the time slot of each of said M bits of said phase word as said each bit enters said first adding means;

and in which said first increment generating means is responsive to said first output signal of said counting means to supply each bit of said binary increment $K_1$ to said first adding means at a time which is coincident with the entering into said first adding means of each bit of corresponding order of magnitude of said phase word.

23. Digitalized tone generating means in accordance with claim 21 and comprising means for phase shifting the tone being generated to encode thereon data from a data input source:

said phase shifting means comprising:

second adding means connected in series with said delay line means and said first adding means in said closed loop circuit means;

means responsive to successive increments of data from said source of input data to generate, at a predetermined periodic rate, a second binary increment $K_2$ having a value that is predetermined in accordance with the nature of each successive increment of data;

means for supplying said second binary increment $K_2$ to said second adding means at said predetermined periodic rate and at specific times coincident with the passing of said phase word through said second adding means;

said second adding means constructed to add together said phrase word and said second binary increment $K_2$ to advance the phase of the tone represented by said phase word.

24. Digitalized tone generating means in accordance with claim 23 comprising:

counting means responsive to the output pulses from said clock pulse source to produce a first output signal which counts and identifies the time slot of each of said M bits of said phase word as said each bit enters said first adding means;

and in which said first increment generating means is responsive to said first output signal of said counting means to supply each bit of said binary increment $K_1$ to said first adding means at a time which is coincident with the entering into said first adding means of each bit of corresponding order of magnitude of said phase word.

25. Digitalized tone generating means in accordance with claim 24 in which:

said counting means is further responsive to the output pulses from said clock pulse source to produce a second output signal which counts and identifies each of the M bits of said phase word as it enters said second adding means;

and in which said second increment generating means is responsive to said second output signal of said counting means to supply each bit of said binary increment $K_2$ to said second adding means at a time which is coincident with the entering of each bit of corresponding order of magnitude of said phase word into said second adder means.

26. Digitalized tone generating means in accordance with claim 21 in which said delay line means has a capacity to hold at least two of said phase words and comprising:

counting means responsive to the output pulses from said clock pulse source means to identify each of said phase words as it circulates within said closed loop circuit means and to identify the time slot occupied by each bit of each word as said bits circulate in said closed loop circuit means.

27. Digitalized tone generating means in accordance with claim 26 in which:

said first increment generating means is constructed to respond to said first output signal of said counting means to supply a unique one of said binary increments $K_1$ to said first adding means each $N^{th}$ circulation of said two or more phase words through said closed loop circuit means;

and in which said first adding means is constructed to add said binary increments $K_1$ to said phase words to produce a sequence of binary words for each of said two or more phase words, which sequences of binary words represent successively occurring phase angles of the tones being generated.

28. Digitalized tone generating means in accordance with claim 27 and comprising means for phase shifting the tones being generated to encode thereon data from a data input source, and comprising:

second increment means connected in series with said delay line means and said first increment generating means in said closed loop circuit means said second incrementing means responsive to the data from said source of input data to generate for each of said two or more phase words, at predetermined periodic intervals, a time coincident second binary increment $K_2$ having a value that is determined in accordance with the nature of said input data, and to add each of said second binary increments $K_2$ to the time coincident circulating phase word to advance the phase of the tone represented by said phase word which is comprised of said sequence of binary words.

29. Digitalized tone generating means in accordance with claim 28 in which:

said counting means is further responsive to the output pulses from said clock pulse source to produce a second output signal which counts and identifies each of the M bits of each phase word as it enters said second adding means;

and in which said second increment generating means is responsive to said second output signal of said counting means to supply each bit of said binary increment $K_2$ to said second adding means at a time which is coincident with the entering into said second adder means of each bit of corresponding order of magnitude of the time corresponding phase word.

30. Digitalized tone generating means in accordance with claim 27 comprising:

data storage means for receiving and storing said input data bits at a rate of S bits per second until T bits have been received, where T is the number of bits that can be encoded on the tones being generated;

gating means responsive to the storing of T bits in said data storage means and further responsive to the output signal of said clock pulse source means to read and analyze the T data bits stored in said data storage means and to generate a series of second binary words, one for reach tone being generated, at a rate equal to the multiplexing rate of said phase words circulating in said closed loop circuit means; successive ones of said second binary words being bit synchronized with predetermined successive ones of said circulating phase words;

said second adding means constructed to add each of said series of second binary words to he time corresponding circulating phase word to produce a phase shift in each phase word in accordance with the value of the second binary word added thereto.

31. Digitalized tone generating means comprising:

closed loop circuit means for circulating therearound, at a circulating rate $f_r$, at least one periodically changing phase word comprised of a serial stream of M data bits, where M is an integer, and comprising:

delay line means constructed to shift said data bits therealong in response to clock pulses supplied thereto at a rate $f_0$; and first adding means connected in series with said delay line means;

clock pulse source means having an output signal supplied to said delay line means to shift data bits therethrough at said $f_0$ rate;

first increment generating means constructed to generate a binary increment $K_1$ and to supply said binary increment $K_1$ to said first adding means at a time which is coincident with each $N^{th}$ circulation of said phase word through said first adding means to produce a sequence of binary words which form said periodically changing phase word in said closed loop circuit means, each binary word having a value representing a specific phase angle of the tone being generated;

output means constructed to receive each binary word each $R^{th}$ circulation thereof in said closed loop circuit means, where R is an integer; and converting means responsive to each of said binary words received in said output means to generate a signal representative of that amplitude of the tone being generated which corresponds to the phase angle represented by said each binary word.

32. Digitalized tone generating means in accordance with claim 31 comprising:

counting means responsive to the output pulses from said clock pulse source means to produce a first output signal which counts and identifies the time slot of each of said M bits of said phase word as said each bit enters said first adding means;

and in which said first increment generating means is responsive to said first output signal of said counting means to supply each bit of said binary increment $K_1$ to said first adding means at a time which is coincident with the entering into said first adding means of each bit of corresponding order of magnitude of said phase word.

33. Digitalized tone generating means in accordance with claim 31 and comprising means for phase shifting the tone being generated to encode thereon data from a data input source; and comprising:

said phase shifting means comprising:

second adding means connected in series with said delay line means and said first adding means in said closed loop circuit means;

second increment generating means responsive to successive increments of data from said source of input data to generate, at a predetermined periodic rate, a second binary increment $K_2$ having a value that is predetermined periodic rate, a second binary increment $K_2$ having a value that is predetermined in accordance with the nature of each successive increment of data;

means for supplying said second binary increment $K_2$ to said second adding means at said predetermined periodic rate and at specific times coincident with the passing of said binary phase word through said second adding means;

said second adding means constructed to add together said binary phase word and said second binary increment $K_2$ to advance the phase of the tone represented by said phase word.

34. Digitalized tone generating means in accordance with claim 33 comprising:

counting means responsive to the output pulses from said clock pulse source means to produce a first output signal which counts and identifies the time slot of each of said M bits of said phase word as said each bit enters said first adding means;

and in which said first increment generating means is responsive to said first output signal of said counting means to supply each bit of said binary increment $K_1$ to said first adding means at a time which is coincident with the entering into said first adding means of each bit of corresponding order of magnitude of said phase word.

35. Digitalized tone generating means in accordance with claim 34 in which:

said counting means is further responsive to the output pulses from said clock pulse source means to produce a second output signal which counts and identifies each of the M bits of said phase word as it enters said second adding means;

and in which said second increment generating means is responsive to said second output signal of said counting means to supply each bit of said second binary increment $K_2$ to said second adding means at a time which is coincident with the entering of each bit of corresponding order of magnitude of said phase word into said second adder means.

36. Digitalized tone generating means in accordance with claim 31 in which said delay line means has a capacity to hold at least two of said phase words and comprising:

counting means responsive to the output pulses from said clock pulse source means to identify each of said phase words as it circulates within said closed loop circuit means and to identify the time slot occupied by each bit of each word as said bits circulate in said closed loop circuit means.

37. Digitalized tone generating means in accordance with claim 36 in which:

said first increment generating means is constructed to respond to said first output signal of said counting means to supply a unique one of said binary increments $K_1$ to said first adder means each $N^{th}$ circulation of said two or more phase words through said closed loop circuit means;

and in which said first adder means constructed to add said binary increments $K_1$ to said phase words to produce a sequence of binary words for each of said two or more phase words which sequences of binary words represent successively occurring phase angles of the tones being generated.

38. Digitalized tone generating means in accordance with claim 37 and comprising means for phase shifting the tone generated to encode thereon data from a data input source;

said phase shifting means comprising:

second incrementing means connected in series with said delay line means and said first incrementing means in said closed loop circuit means;

said second incrementing means responsive to the data from said source of input data to generate for each of said two or more phase words, at predetermined periodic intervals, a second binary increment $K_2$ having a value that is determined in accordance with the nature of said input data, and to add said second binary increments $K_2$ to said circulating phase words to advance the phase of the tone represented by said phase word, which is comprised of said sequence of binary words.

39. Digitalized tone generating means in accordance with claim 38 in which:

said counting means is further responsive to the output pulses from said clock pulse source means to produce a second output signal which counts and identifies each of the M bits of each phase word as it enters said second adding means;

and in which said second increment generating means is responsive to said second output signal of said counting mean s to supply each bit of said binary increment $K_2$ to said second adding means at a time which is coincident with the entering into said second adder means of each bit of corresponding order of magnitude of the time corresponding phase word.

40. Digitalized tone generating means in accordance with claim 37 comprising:

data storage means for receiving and storing said input data bits at a rate of S bits per second until T bits have been received, where T is the number of bits that can be encoded on the tones being generated;

gating means responsive to the storing of T bits in said data storage means and further responsive to the output signal of said clock means to read and analyze the T data bits stored in said data storage means and to generate a series of second binary words, one for each tone being generated, at a rate equal to the multiplexing rate of said phase words circulating in said closed loop circuit means; successive ones of said second binary words being bit synchronized with predetermined successive ones of said circulating phase words;

said second adding means constructed to add each of said series of second binary words to the time corresponding circulating phase word to produce a phase shift in each phase word in accordance with the value of the second binary word added thereto.

41. Digitally implemented signal waveform generating means comprising, in combination:

binary number circulating means including incrementing means for incrementing a circulating binary word in said circulating means once each complete cycle thereof, the increment being a positive integral number;

phase to amplitude converting means connected to said binary word circulating means for receiving the circulating stored word once each complete circulation thereof and providing as an output a signal pulse having an energy content proportional to the numerical value of said circulating word;

the circulating word in said binary word circulating means having a continuously repeating numerical sequence which may be considered representative of phase positions of an electrical signal; and filter means connected to the output of said phase to amplitude converting means for converting said variable energy pulses to an analog signal representative in frequency of the incremental change of said binary words.

42. Apparatus as claimed in claim 41 wherein said circulating means further includes further incrementing means for periodically and abruptly change the numerical value of said binary word wherein the periodicity of said second incremental change is less than the periodicity of a full cycle of said binary word, the output signal from said apparatus changing phase of the resulting analog signal as a result of said second incremental change.

43. Apparatus as claimed in claim 41 wherein said phase to amplitude converting means includes means for changing the binary word output from said circulating means to a binary word indicative of amplitude of a sine wave at a phase represented by said circulating binary word; and said phase to amplitude converting means also includes digital to analog converting means for providing the variable pulse energy output to said filter means.

44. The method of providing a signal waveform output comprising the steps of:

continuously incrementing a numerical sequence of numbers in a predetermined order wherein said numerical sequence represents phase of the output signal waveform being produced;

converting said incremental numerical number to a binary number indicative of amplitude at the phase represented by said numerical number;

converting said digital number representing amplitude to a pulse whose energy content is representative of said digital number; and filtering said variable pulse energy signal to provide an output waveform indicative of the pulse energy content and polarity.

UNITED STATES PATENT OFFICE
CERTIFICATE OF CORRECTION

Patent No. 3,597,599 Dated August 3, 1971

Inventor(s) William J. Melvin

It is certified that error appears in the above-identified patent and that said Letters Patent are hereby corrected as shown below:

Col. 7, line 21, after "128" delete --37-- line 69, change "65th" to --64th--

Col. 8, line 55, change "Fig. a" to --Fig. 1a--

Col. 9, line 69, change "360°" to --180°-- and insert thereafter --and a "1" denotes the second two quadrants lying between 180° and 360°.--

Col. 10, line 35, change "lease" to --least--

Col. 11, line 11, change "$f_2$" to --$f_s$-- line 21, change "form" to --from-- line 69, change " "1" " to --"1's"--

Col. 12, line 1, change " "1" " to --"1's"-- line 12, change " "1" " to --"1's"-- line 29, change "180" to --580-- line 55, change "$f_2$" to --$f_s$--

UNITED STATES PATENT OFFICE
CERTIFICATE OF CORRECTION

Patent No. 3,597,599 Dated August 3, 1971

Inventor(s) William J. Melvin PAGE - 2

It is certified that error appears in the above-identified patent and that said Letters Patent are hereby corrected as shown below:

Col. 13, line 58, after "rate" delete --of--

Col. 15, line 60, change " $_2$ " to --$\Phi_2$--

Col. 20, line 16, delete "with the most significant", first occurrence

Col. 20, line 65, change "$\Delta$" to --$\Delta\Phi$--

Col. 22, line 28, change "sorted" to --stored--

Col. 23, line 17, change "comprises" to --comprised--

Col. 25, line 59, change "tine" to --time--

Col. 27, line 64, change "phrase" to --phase--

Col. 29, line 14, change --he-- to --the--

Col. 29, lines 71 and 72, delete --predetermined periodic rate a second binary increment $K_2$ having a value that is--

Signed and sealed this 25th day of July 1972.

(SEAL)
Attest:

EDWARD M.FLETCHER,JR. ROBERT GOTTSCHALK
Attesting Officer Commissioner of Patents